United States Patent

Troy

[15] 3,660,189
[45] May 2, 1972

[54] CLOSED CELL STRUCTURE AND METHODS AND APPARATUS FOR ITS MANUFACTURE

[72] Inventor: Constantine T. Troy, 1330 Cleveland Avenue, Wyomissing, Pa. 18644

[22] Filed: Apr. 28, 1969

[21] Appl. No.: 819,719

[52] U.S. Cl. ..............................156/145, 156/147, 156/271, 156/290, 156/292, 264/96
[51] Int. Cl. ..................................B32b 31/02, B32b 31/00
[58] Field of Search..................156/145, 146, 147, 290, 291, 156/292, 271; 264/96

[56] References Cited

UNITED STATES PATENTS

| | | | |
|---|---|---|---|
| 2,566,533 | 9/1951 | Poux | 156/146 X |
| 2,670,501 | 3/1954 | Michiels | 156/145 X |
| 3,011,930 | 12/1961 | Dworak | 156/145 X |
| 3,244,571 | 4/1966 | Weisman | 156/290 X |

FOREIGN PATENTS OR APPLICATIONS

| | | | |
|---|---|---|---|
| 747,105 | 3/1956 | Great Britain | 156/145 |
| 625,657 | 7/1949 | Great Britain | |
| 908,579 | 10/1962 | Great Britain | |
| 555,696 | 1/1957 | Italy | |

Primary Examiner—Carl D. Quarforth
Assistant Examiner—E. E. Lehmann
Attorney—Synnestvedt & Lechner

[57] ABSTRACT

Cellular cushioning material is prepared by sealing an elastic substance within cells that are formed between two flexible films. When the elastic material is a gas, means may be provided to charge the cells at superatmospheric pressure to achieve full inflation of the cells and maximum efficiency of the cushioning material.

6 Claims, 74 Drawing Figures

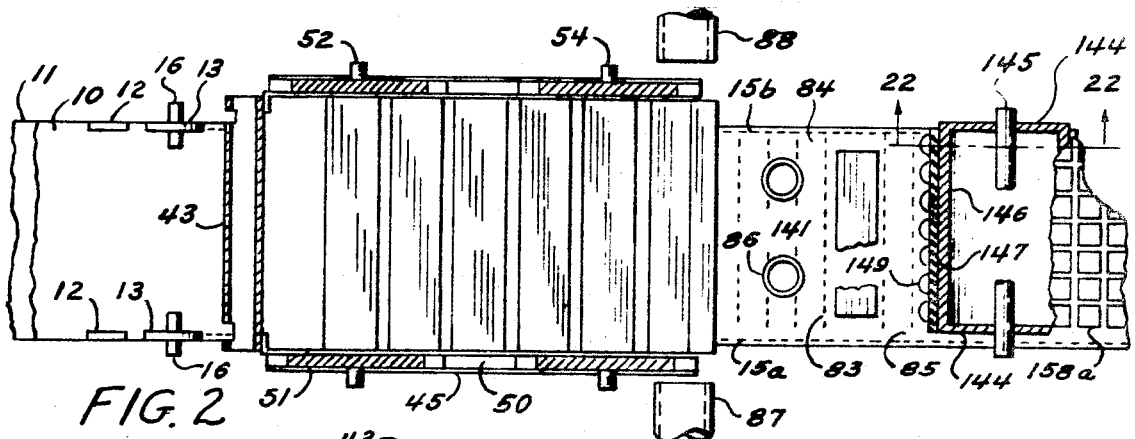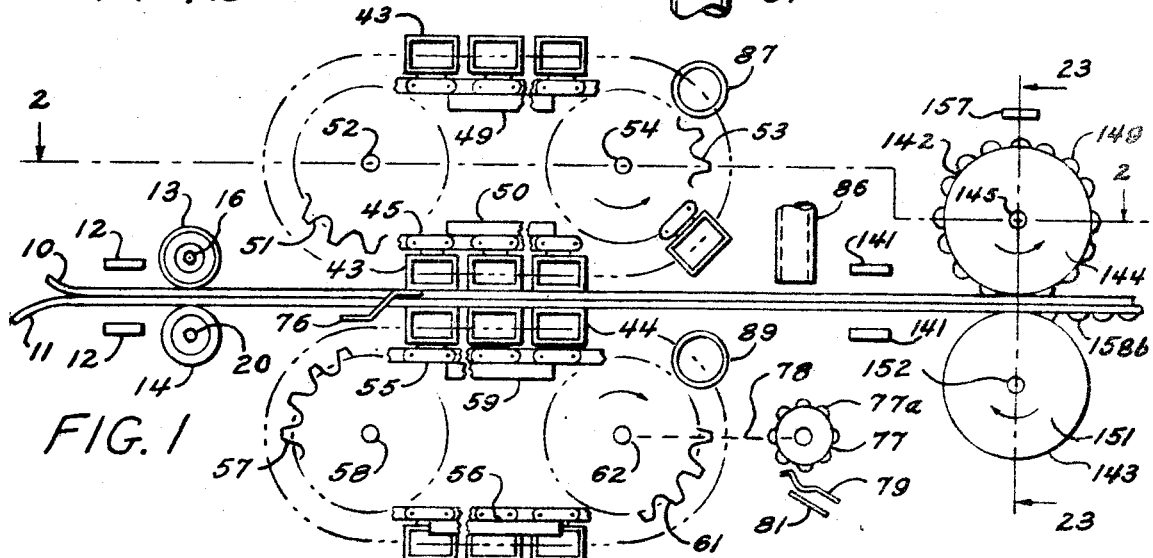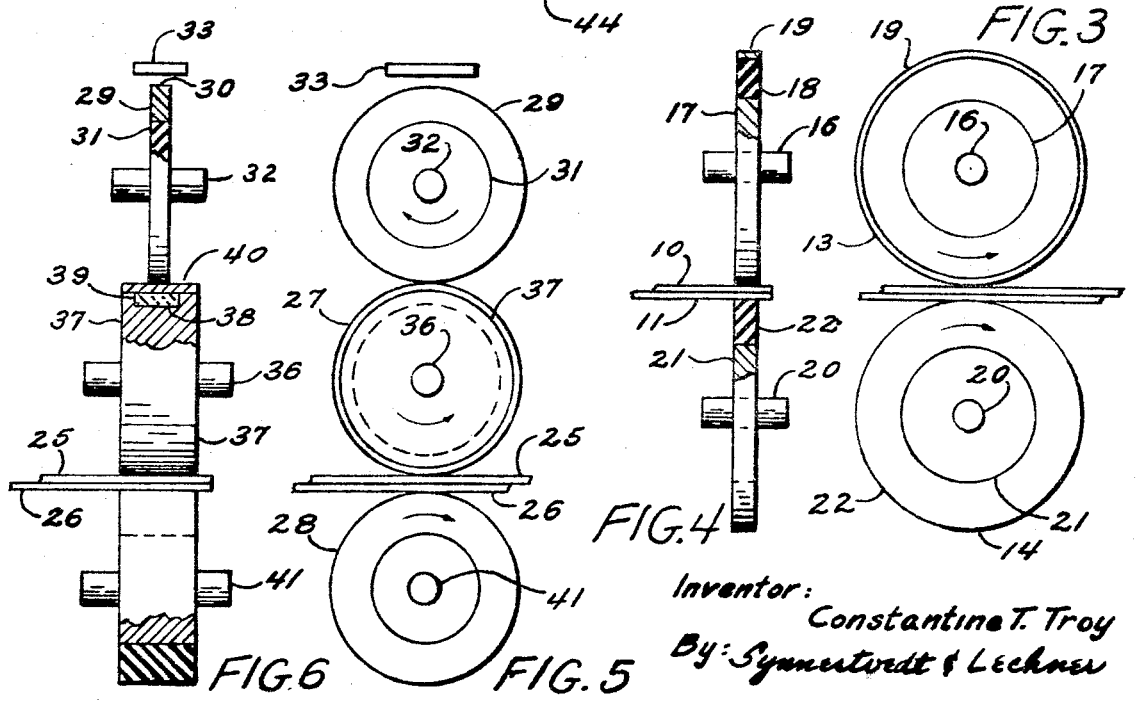

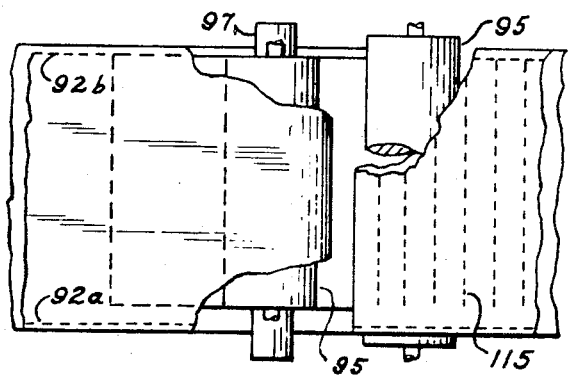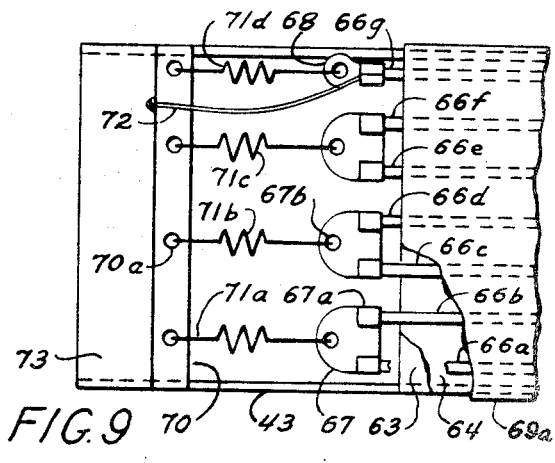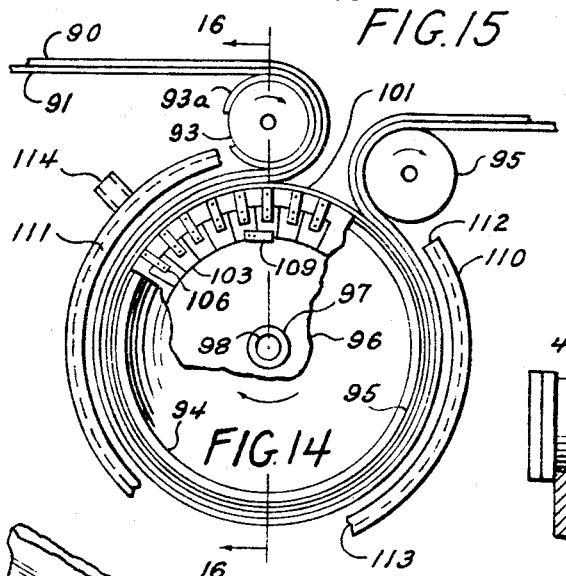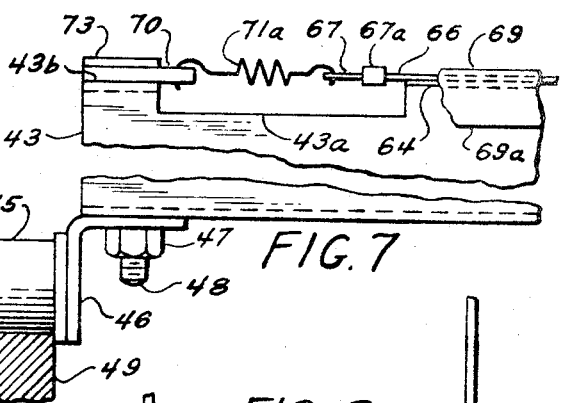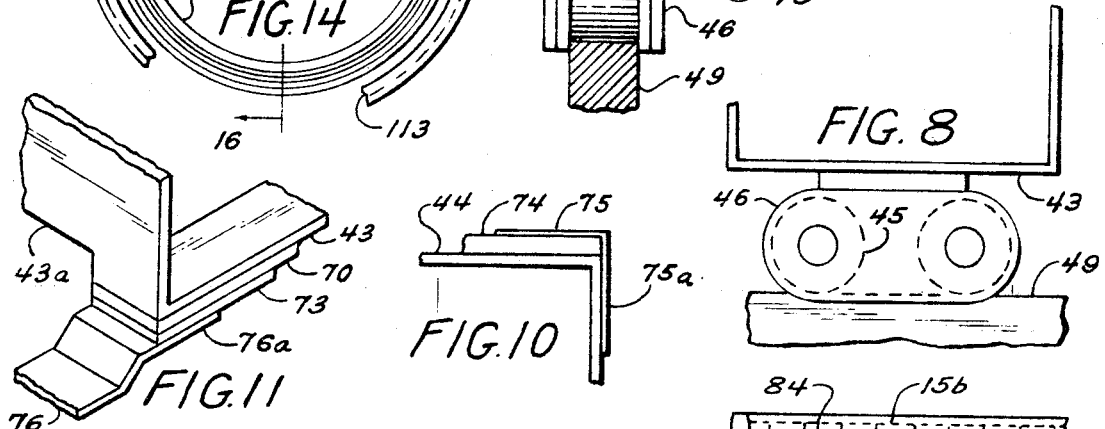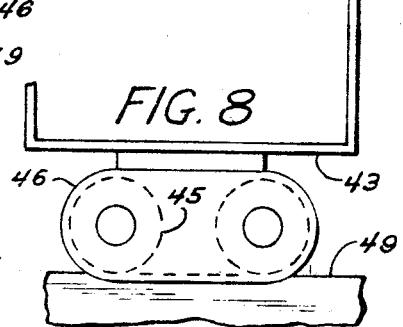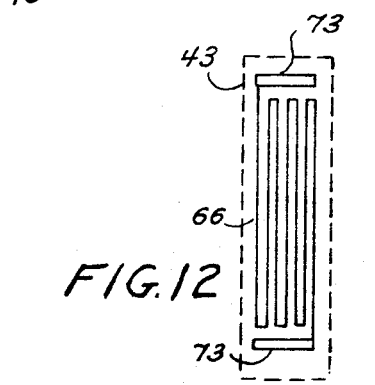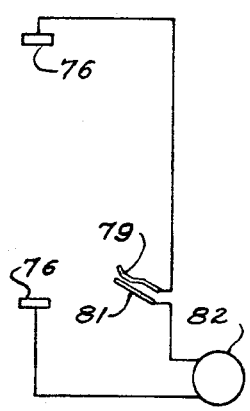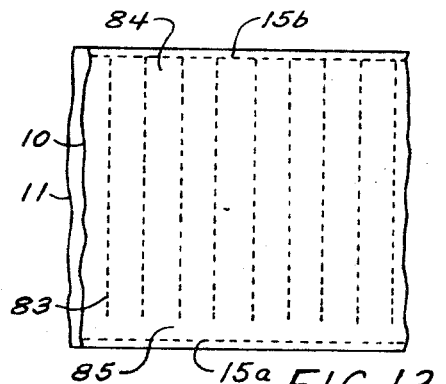

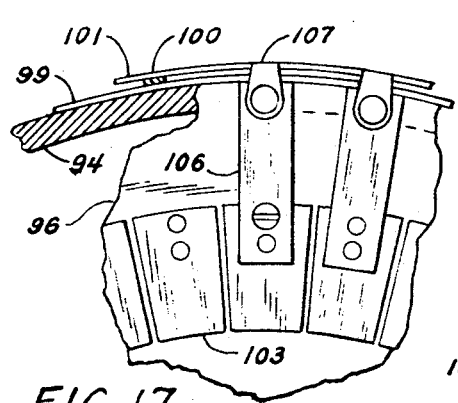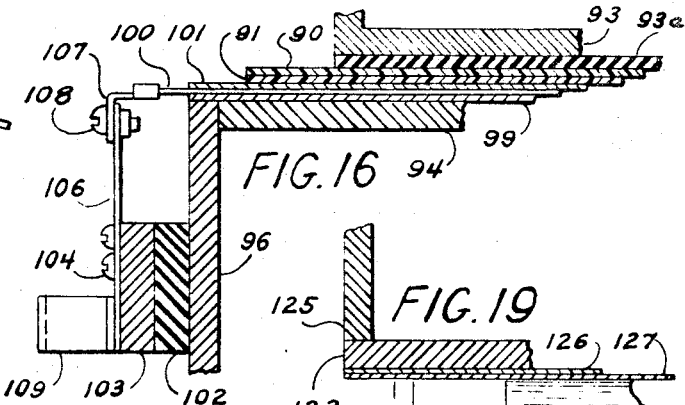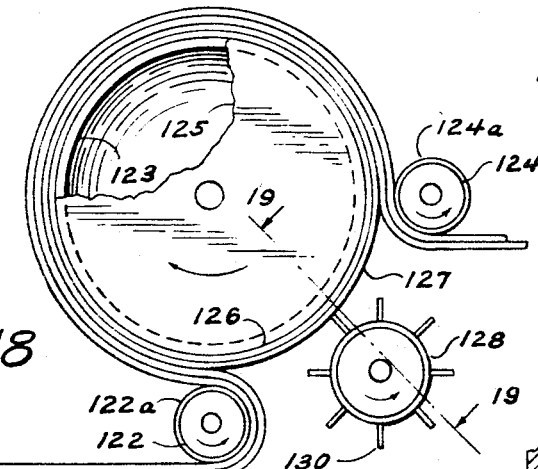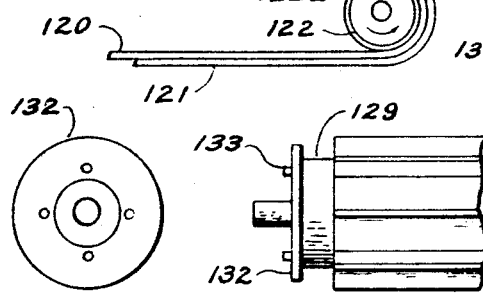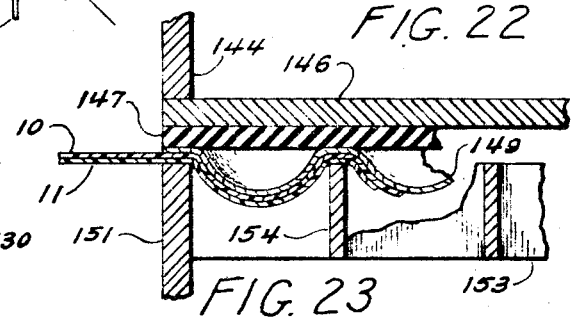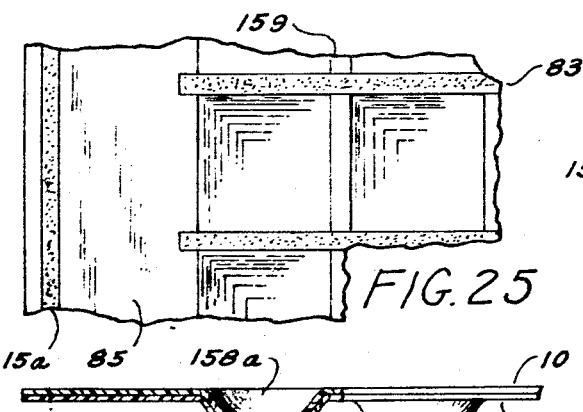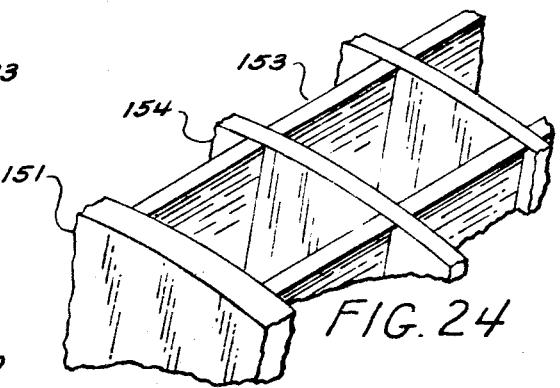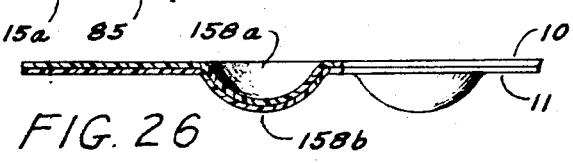

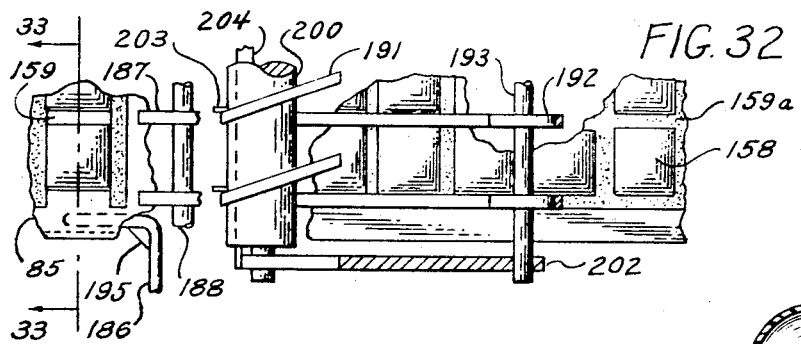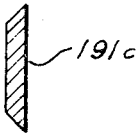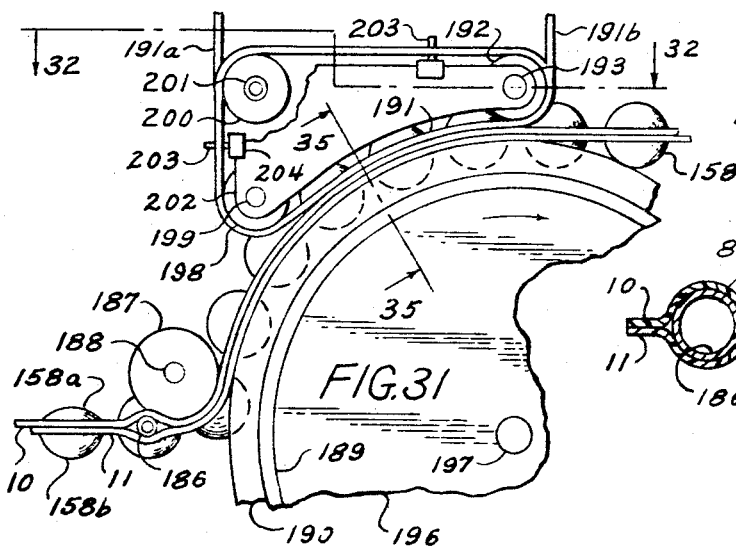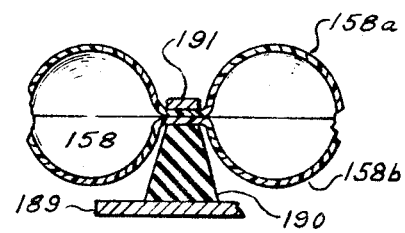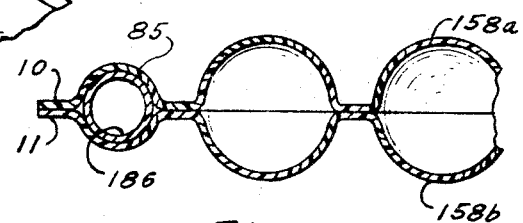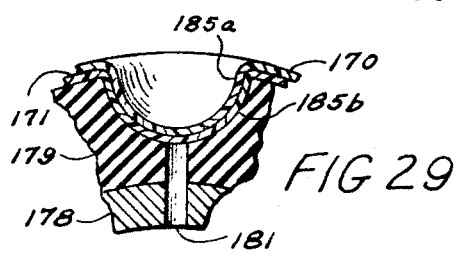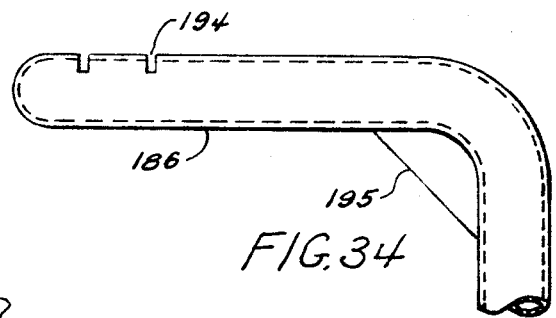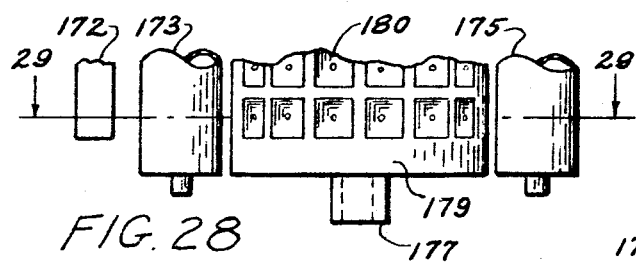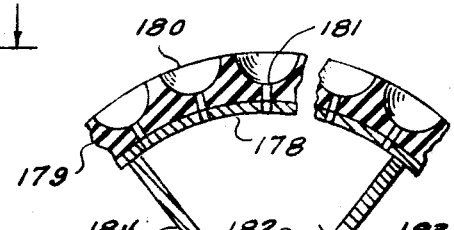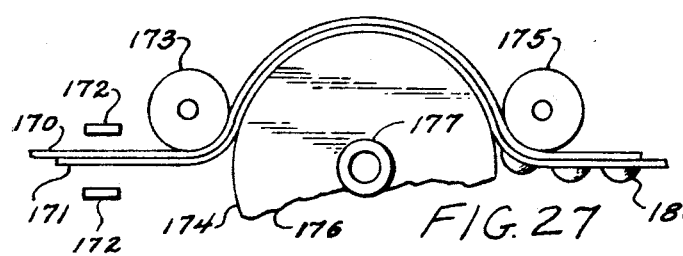

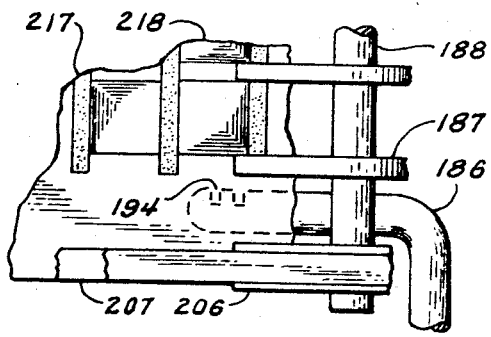
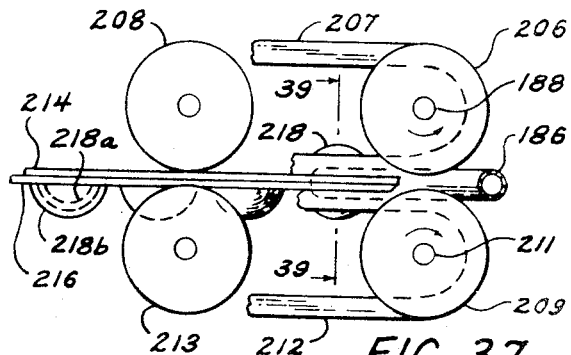
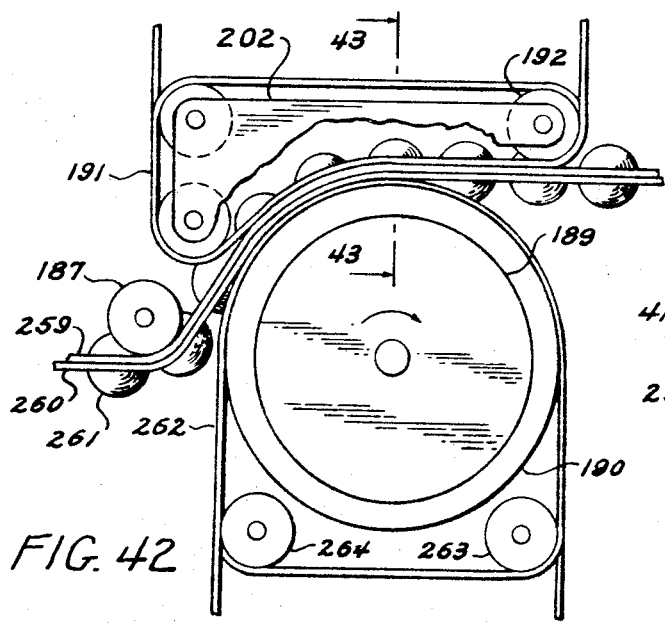
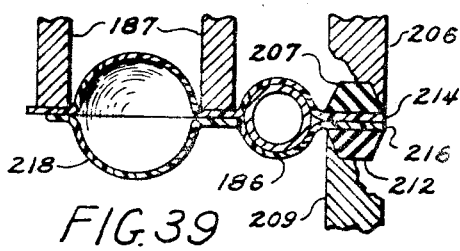
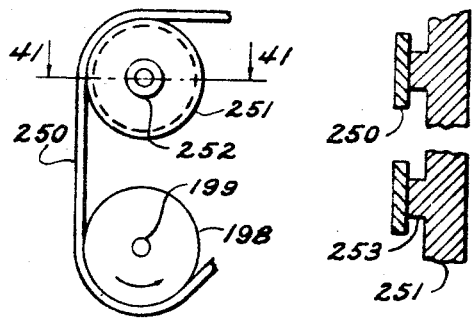
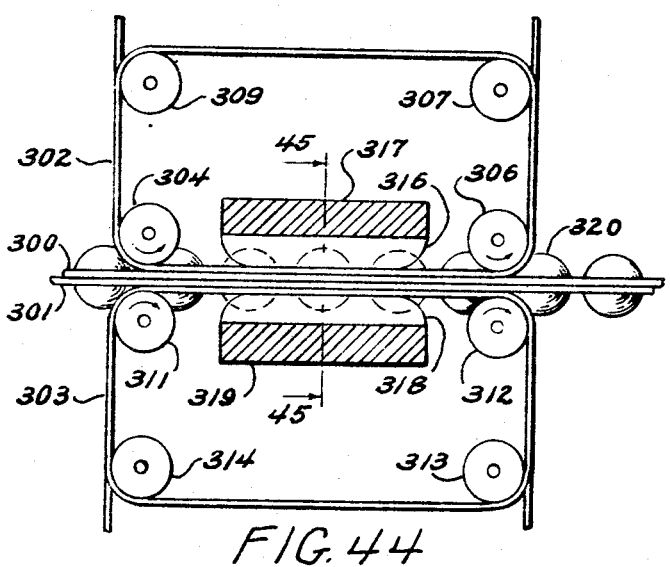

Inventor:
Constantine T. Troy
By: Synnestvedt & Lechner

Inventor:
Constantine T. Troy
By: Synnestvedt & Lechner

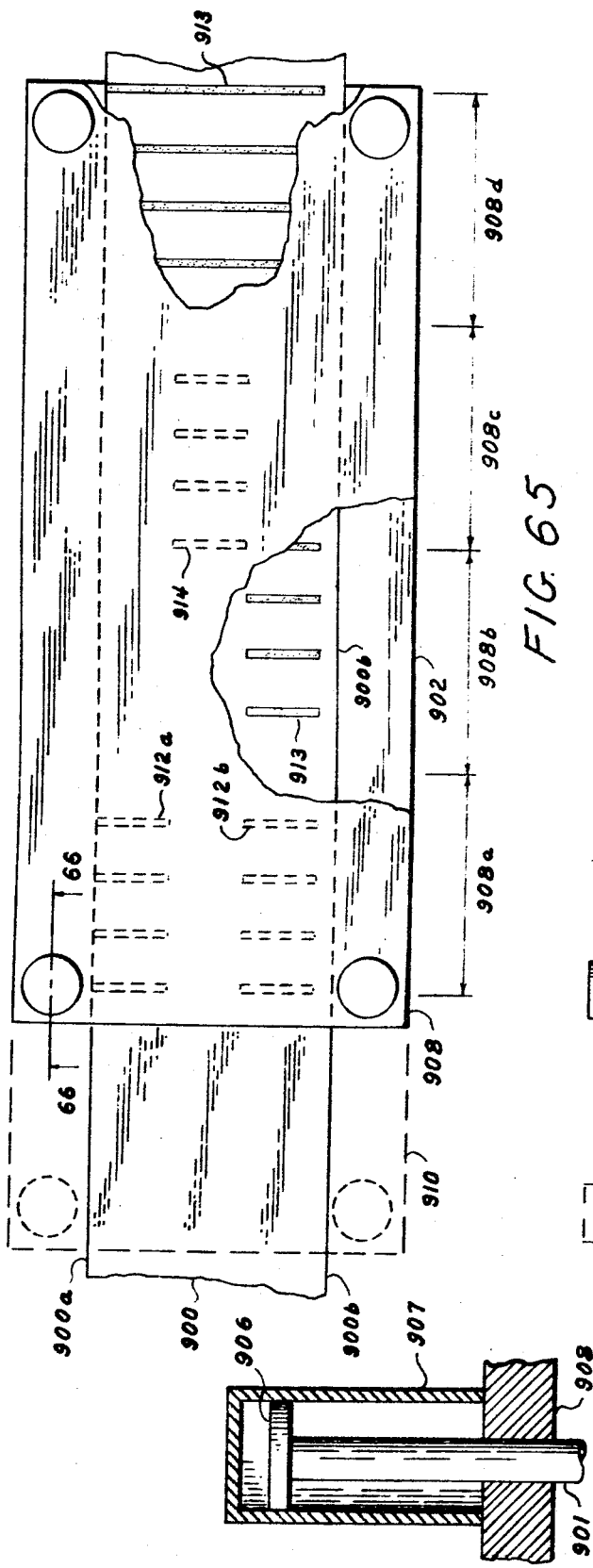
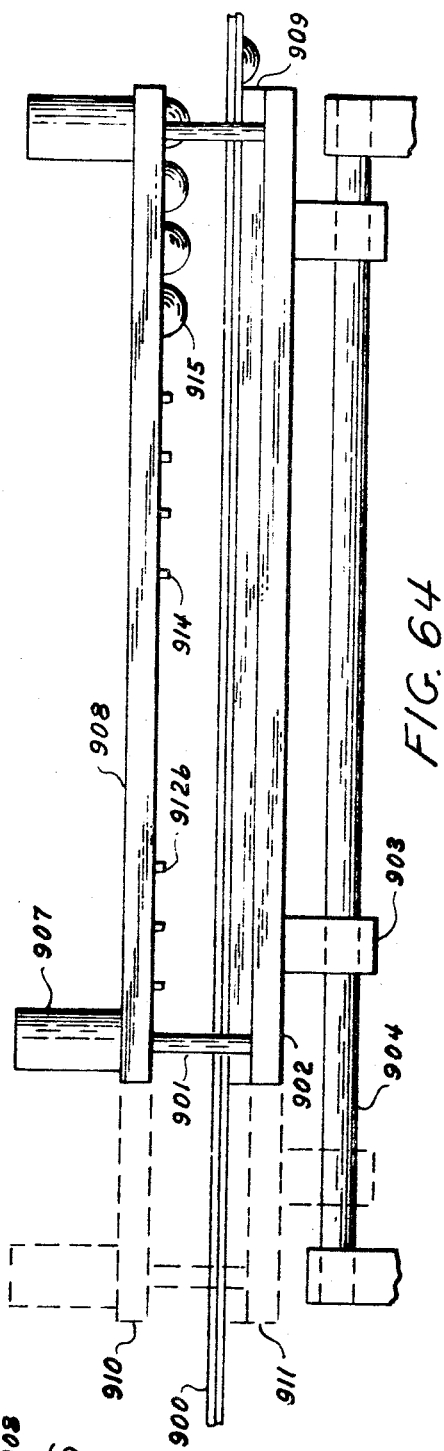

CLOSED CELL STRUCTURE AND METHODS AND APPARATUS FOR ITS MANUFACTURE

In a preferred embodiment of the invention, the cushioning material is formed in several steps, making it possible to store or transport an uninflated prefabricated structure that may later be inflated to complete the construction of the cushioning material at the time of intended use.

Novel apparatus is proposed for use in the method of this invention, and of particular importance is the apparatus for forming continuous linear heat seals as two superimposed sheets of film are advanced in a lengthwise direction. This apparatus makes use of a heated metal tape in the form of an endless belt that contacts and presses the moving films together and advances with the film for a sufficient distance to insure the formation of a secure bond between the films.

BACKGROUND OF THE INVENTION

1. Field of the Invention

The present invention relates to cushioning material and improved methods and apparatus for making such cushioning material. More particularly, this invention relates to cushioning material of the type in which two plastic films are joined to form a sheet comprised of a plurality of individual cells filled with an elastic substance. Cushioning material of the type here described is particularly useful in packaging articles to protect them from damage, in forming yieldable supporting elements that can be used for seat cushions, mattresses, beach pads and the like, in providing large sheets useful as wall or roof insulation, and in fabricating containers that can keep substances hot or cold for long periods of time. As the invention may find primary utility in making packaging materials, it is discussed below in this context, although it should be understood that this is for convenience of description and the invention is not so limited.

2. Description of the Prior Art

In packaging goods for shipment or storage, it is frequently necessary to surround individual articles with cushioning material to maintain an article in a fixed position within a package and to absorb impact and other forces should the package be dropped or otherwise carelessly handled. The least expensive and most widely used of these cushioning materials are cellulose materials such as crumpled newspaper, waste paper, excelsior, waste cotton, textile scraps, and the like. All of these materials suffer from the disadvantage that they are not elastic, but, when crushed or compacted, tend to take a permanent set in a more dense form. This detracts from the cushioning that these packaging materials can provide since densification of the packaging material will increase the shock forces that are transmitted to the article. Further, densification will tend to reduce the cushioning volume and permit the article to shift more freely within the container.

In addition to these functional defects, cellulose cushioning materials have practical disadvantages. For example, in their finely divided or shredded form, they may carry considerable dust, dirt and lint. To avoid this, it is sometimes necessary to prepackage or wrap articles to assure that they will arrive at their destination in a clean condition. When the articles are removed from the package, the packaging materials can be of extreme nuisance from a housekeeping standpoint.

The composition of these cellulosic packaging materials and their finely divided or shredded form may present a very considerable fire hazard. This is particularly true at the shipping or packaging point where a large amount of these highly combustible materials must be stored.

The conventional packaging materials give no protection to the articles from a standpoint of being impervious to gases. Thus, fumes, corrosive vapors, moisture, and the like, may be transmitted to the product being shipped which may cause oxidation and corrosion of the article and permit the growth of mildew and fungus.

When in finely divided or shredded form, conventional packaging materials make excellent nesting places for small animals and, as a result, easily may become infested by rodents, insects and other vermin.

Due to the comparatively poor and relatively unpredictable nature of the common cushioning materials, it is common practice to allow a considerable safety factor by surrounding an article to be shipped with a liberal quantity of packaging material. This may appreciably increase shipping costs, both by increasing the weight of the package in which the article is shipped and by increasing the cubage since a larger shipping container is required.

To avoid the inherent difficulties of the shredded cellulosic shipping materials, attempts have been made to prepare more efficient materials that have more uniform and predictable properties and are cleaner, neater and safer to use. One of the more interesting of these substitutes makes use of two sheets of material, such as plastic film, that are joined to form a plurality of closed cells. A common method of doing this is to emboss a first sheet of material with a pattern of depressions, coat a second sheet with adhesive and adhere the two sheets together so that air is trapped in the embossed pattern and individual resilient sealed cells are formed. Alternatively, instead of using an adhesive to laminate the sheets, heat sealing techniques may be used.

Packaging or cushioning material so prepared from laminates may be quite useful, but the present means known in the art to form laminates on a continuous basis with individual sealed cells are subject to certain inherent difficulties. For example, in one method known to the prior art, a first continuous web of plastic film is passed over a series of heated rolls. After the film has been softened, the film is passed over a heated roll having a pattern of cavities and a series of embossments is formed by vacuum drawing methods. A second unembossed heated web is then run against the first embossed web as the first web is passing over the embossing roll and the two sheets are heated sufficiently close to their melting point to cause fusion of the films at their point of contact, thus forming individual sealed cells. When this technique is used, the web of cushioning material will have one embossed side and one flat side.

Cushioning material of this type now available on the market is frequently manufactured from plastic film which is itself a laminate. One lamina of the film may be selected for its low melting point and ease of fusing to the mating sheet of film, and the other lamina may be selected for its relatively high melting point, its superior tensile strength, and its low gas and vapor transmission rate. It can readily be understood that these combinations of properties are quite beneficial since, using the above-described technique, it is desired to get a strong bond by melting and yet retain sufficient strength of the plastic films so that they can be handled without tearing. It is also apparent that the value of the cushioning materials would be destroyed if the gas transmission rate were sufficiently high to permit the cellular structure to collapse under load.

While cushioning material in the form of cellular plastic sheets avoids many of the difficulties encountered in the use of cellulosic type materials, they, too, suffer from certain inherent physical inadequacies and may present difficult problems in their manufacture. The primary defect in the structure of these closed cell plastic laminates is that the air cells are sealed while the film is heated to an elevated temperature. After the web has cooled, the air contracts, causing the cells to shrink and lose some of their volume and firmness. This condition may be visually recognized by the characteristic dimpled appearance of the cell walls of packaging material formed in this manner. While it is perhaps unnecessary to point out that this contraction of the air reduces the cushioning ability of the cells, a more subtle point, somewhat a correlary to this shrinkage effect, should be noted; that is, in the utilization of present production methods and apparatus, it is not possible to control the pressure within the individual cells to be other than atmospheric. If, for example, air at superatmospheric pressure could be sealed within the cells, maximum inflation of the cells would be assured as well as making it possible to alter the elastic properties of the cells. By increasing the air pressure, firmer cushioning material would be provided that could support heavier loads with less deformation. Also, note that it is not possible to include a gas other than air within the cells using the present technology.

The cellular films known to the prior art are also inefficient in that they are embossed on but a single side and, at best, obtain only 50 percent utilization of the plastic film. While in theory both films can be embossed, production equipment has not yet been developed to make such technique practical.

The resiliency of the cushioning material may also be altered by including a solid elastic material, such as an elastomer, within the individual cells. This is also impractical utilizing known methods and apparatus.

In addition to the structural defects of cellular packaging material, many difficulties are inherent in its production utilizing conventional methods and apparatus. For example, temperature control of the various films can be quite important and, in some instances, it is advantageous to maintain the embossed film at a temperature different from the backing or flat film. In addition to requiring relatively elaborate machinery and trained operators, an appreciable start-up time may be required before the operation becomes stable, thus producing scrap and making it economically undesirable to use the equipment if only relatively small quantities of cushioning are required.

It follows that since it is not economic to make short runs of this cushioning material, the cushioning material must be made at a central manufacturing location and then shipped to those who desire to use it. The delivered cost of the bulky cushioning material is significantly increased by freight rates that usually are higher for materials of low density.

Lastly, it may be noted that it is impractical to add slitting-to-width and cutting-to-length devices onto machine facilities. These auxiliary devices may require momentary shut-downs and start-ups for which the film-fabricating equipment is not well adapted. It can be understood that momentary shut-downs can destroy stable conditions as, for example, to cause a plastic film to overheat.

SUMMARY OF THE INVENTION

Accordingly, it is an object of this invention to provide a new and improved cushioning material and methods and means for its manufacture.

A further object of this invention is to provide an improved cellular structure that may variously serve as a cushioning material, as insulation, or as a bouyancy device.

Another object of this invention is to provide a closed cellular structure and methods and means for its manufacture in which it is possible to select both the gas with which the cells are filled and the pressure of the gas within the cells.

Another object of this invention is to provide a prefabricated form that may, when desired, be inflated and converted into a closed cellular structure.

Another object of this invention is to provide apparatus for making prefabricated forms that may readily be inflated and converted into a closed cellular structure.

Another object of this invention is to provide methods and apparatus for inflating prefabricated forms and converting them into closed cellular structures.

Another object of this invention is to provide a closed cellular structure in which the cells contain a liquid or a deformable solid, such as an elastomer.

Another object of this invention is to provide a novel cushioning material that may be used for packaging that is lightweight, resilient, and free from dirt and debris.

Another object of this invention is to provide novel methods and apparatus for continuously sealing superimposed laminae of heat-fusible material together.

Another object of this invention is to provide cushioning material in which maximum utilization of the materials of construction is obtained.

Another object of this invention is to provide methods and apparatus whereby the resiliency of a closed cell cushioning material can adjustably be altered during manufacture.

Briefly, these and other objects of this invention are achieved by sealing an elastic material, such as a gas, within cells that are formed between two flexible films. In the preferred embodiment, the films are embossed and adhered to each other along a series of spaced parallel lines, then the volume between the spaced lines is inflated with an elastic material, and finally, a closed cellular structure is completed by sealing the two plastic films to each other along a second set of spaced parallel lines that intersect with the first set of parallel lines.

DEFINITIONS

As used in this specification and the appended claims, the following terms are given the following meanings.

"Prefab" refers to a partially fabricated cushioning structure made from a pair of plastic films joined together along a series of parallel spaced lines to form elongated pockets or tubes that are adapted to be inflated with an elastic material and sealed into a plurality of closed cells.

"Long seal" refers to a line along which two sheets of film are joined in the direction of their lengthwise (machine) direction.

"Cross seal" refers to a line along which two sheets of film are joined in the direction of their widthwise (cross machine) direction.

"Marginal seal" refers to a long seal that joins the margins of two sheets of film.

"Long channel" refers to the interstitial space between two long seals.

"Cross channel" refers to the interstitial space between two cross seals.

"Near side" refers to that side of the equipment visible in front elevation, and "far side" refers to the opposite side of the equipment.

"Rubber" refers to heat-resistant elastomers such as silicone rubbers.

"Air cell cushioning" refers to closed cellular materials that may contain air or other gases within the cells.

DESCRIPTION OF THE DRAWINGS

FIG. 1 is a front elevation of the preferred form of apparatus for making a prefab. This uses, in sequence, margin sealing, cross sealing with bar chain assemblies and embossing.

FIG. 2 is a section on line 2—2 in FIG. 1.

FIG. 3 is a front elevation and FIG. 4 a left side elevation of part of the margin sealing equipment shown in FIG. 1.

FIG. 5 is a front elevation and FIG. 6 a left side elevation of another possible construction for making margin seals.

FIG. 7 is a front elevation, partially broken away, of an end of one of the bars in the upper bar chain assembly of FIG. 1, shown in its return path.

FIG. 8 is a partial left elevation and FIG. 9 a plan, partially broken away, of the end of the bar shown in FIG. 7.

FIG. 10 is a partial end elevation of one of the bars in the lower bar-chain assembly in FIG. 1.

FIG. 11 is a perspective view showing how a contact plate on the bar pictured in FIG. 9 slides over a stationary contact brush.

FIG. 12 is a schematic wiring diagram of the apparatus shown in FIG. 1.

FIG. 13 is a plan of two film sheets with margin seals, cross seals and cross channels made by the apparatus shown in FIG. 1.

FIG. 14 is an end elevation and FIG. 15 a plan, partially broken away, showing a first alternate construction for making cross seals.

FIG. 16 is a partial section on line 16—16 in FIG. 14.

FIG. 17 is a partial left elevation of FIG. 16.

FIG. 18 is an end elevation, partially broken away, of a second alternate construction for making cross seals.

FIG. 19 is a partial section on line 19—19 in FIG. 18.

FIG. 20 is a front elevation of a disc which may be used for making margin seals.

FIG. 21 shows the disc attached to a heating roll shown in FIG. 18.

FIG. 22 is a partial section on line 22—22 in FIG. 2 showing details of the embossing rolls.

FIG. 23 is an enlarged partial section on line 23—23 in FIG. 1 showing other details of the embossing rolls.

FIG. 24 is a perspective view of part of the female embossing roll.

FIG. 25 is a plan and FIG. 26 a front elevation, partially broken away, of part of the near side of a finished prefab in its preferred form.

FIG. 27 is an end elevation of an alternate embossing construction using a vacuum to emboss a pair of film sheets passing through the equipment.

FIG. 28 is a partial plan of the construction shown in FIG. 27 with the film sheets omitted.

FIG. 29 is a small partial section and FIG. 30 a large partial section on line 29—29 in FIG. 28.

FIG. 31 is an end elevation of a preferred form of equipment for converting a prefab into air cell cushioning by inflating the cells and making long seals between them.

FIG. 32 is a view, partially in section, on line 32—32 in FIG. 31.

FIG. 33 is a partial section on line 33—33 in FIG. 32.

FIG. 34 is a detail, in plan, of a pipe used in the construction of FIG. 31.

FIG. 35 is a partial section on line 35—35 in FIG. 31.

FIG. 36 is a section of one type of tape strand used for making long seals.

FIG. 37 is an end elevation, partially in section, of equipment for inflating a prefab made without margin seals.

FIG. 38 is a plan of a portion of FIG. 37.

FIG. 39 is a section on line 39—39 in FIG. 37.

FIG. 40 shows an optional construction for heating tape strands used for making long seals.

FIG. 41 is a detailed partial section on line 41—41 in FIG. 40.

FIG. 42 is an end elevation of a first alternate construction for making long seals, the sheets of film traveling over a cylinder and heat being applied by tape strands above and below the film sheets.

FIG. 43 is a partial section on line 43—43 in FIG. 42.

FIG. 44 is a front elevation of a second alternate construction for making long seals, the sheets of film traveling in a straight line.

FIG. 64 is a front elevation and FIG. 65 a plan, partially broken away, of an alternate construction using reciprocating tables to make a prefab.

FIG. 66 is a view, partially in section, taken in part along line 66—66 in FIG. 65 showing details of one of the air cylinders in FIG. 65.

Referring now to the drawings, FIGS. 1 and 2 show the preferred form of the invention for making a prefab. A top sheet of film 10 and bottom sheet 11 enter the machine at the left. Although one sheet may be thicker or thinner than the other, they are shown as having the same thickness to simplify the drawing. The margins of sheets 10 and 11 pass between electrical radiant heaters 12 which raise the margin temperatures close to the melting point. Each heater 12 is preferably of the open coil type with low mass, enabling it to come up to operating temperature quickly. Each sheet margin is then gripped between a sealing wheel 13 and a pressure wheel 14 which press the heated margins together forming margin seals shown by dotted lines 15a and 15b. Wheels 13 and 14 are driven by suitable gearing (not shown) to advance the film sheets to the right in FIG. 1.

Figure 45:
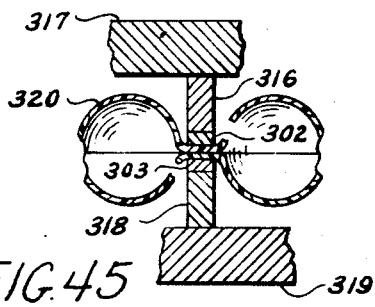
FIG. 45 is a section on line 45—45 in FIG. 44.

Each sealing wheel 13 comprises a shaft 16 fixed in a metal hub 17 (FIGS. 3 and 4). Metal hub 17 carries a rubber portion 18 on which is bonded a thin metal rim 19. Each pressure wheel 14 comprises a shaft 20 fixed in a metal hub 21 on which is bonded a rubber working portion 22. It will be seen that this construction minimizes heat loss from the margins of the sheets as they are being sealed, gives the parts low thermal inertia and makes it possible for them to rise quickly to operating temperature.

Another possible construction for making margin seals is illustrated in FIGS. 5 and 6. On each side of the machine the margins of top sheet 25 and bottom sheet 26 pass between sealing wheel 27 and pressure wheel 28. Above and in contact with sealing wheel 27 is a heater disc 29 having a narrow face 30. Heater disc 29 is carried on a central fiber body 31 which is fixed on shaft 32. Close to the narrow face 30 is located an electric radiant heater 33, preferably of the open coil type.

Sealing wheel 27 comprises a shaft 36 fixed in a metal body 37 which has an annular groove 38 filled with heat insulation 39 such as fiber glass. A thin band 40 of metal that does not conduct heat well, such as Nichrome, from 1 to 10 mils thick, covers insulation 39 and is bonded to the outer portion of the wheel body 37. Pressure wheel 28 is fixed on shaft 41 and has the same construction described for pressure wheel 14. Shafts 32, 36 and 41 are driven through suitable gearing (not shown) to advance the film sheets 25 and 26 to the right in FIG. 5.

In operation, the radiant heater 33 raises the temperature of heater disc 29. A portion of this heat is "printed" or transferred by conduction to band 40, producing a narrow strip of heated metal in the center of band 40. The heat in this narrow strip is progressively transferred by conduction to sheet 25 and thence to sheet 26, thus sealing the margins. The principles are known to those skilled in the art. It will be seen that the parts carrying heat have low mass, enabling them to rise to operating temperature quickly.

The sheets with margins sealed by one of the methods described above now pass into what will be termed the "cross seal unit." In the preferred form of the invention shown in FIG. 1, the cross seal unit receives sheets 10 and 11 between bars 43 in an upper bar-chain assembly and bars 44 in a lower bar-chain assembly. In number, bars 44 may equal or exceed bars 43. In this case, the drawings show each bar-chain assembly with the same number of bars.

Each bar 43 and 44 is a metal tube of rectangular section. The opposite ends of each bar 43 are attached to opposite links of parallel roller chains 45. As shown in FIG. 7, the link plate 46 of a typical chain 45 is held by nut 47 on stud 48 welded to bar 43. The parallel roller chains 45 run over fixed upper tracks 49, around sprockets 51 on shaft 52, under fixed lower tracks 50 and around sprockets 53 on shaft 54. Bars 44 are similarly attached to parallel roller chains 55 running over fixed lower tracks 56, around sprockets 57 on shaft 58, over upper tracks 59 and around sprockets 61 on shaft 62. Tracks 59 may be raised or lowered by adjusting screws (not shown). Therefore, those portions of roller chains 55 traveling over tracks 59 may be forced upward, bringing each bar 44 into regulated pressure contact with a mating bar 43 as the pair of bars travels to the right, carrying sheets 10 and 11 through the cross seal unit.

FIGS. 7 and 9 show how there is adhered to the upper surface 63 of each bar 43 a sheet of glass cloth 64 on which lays any convenient number, in this case seven being shown, of electric resistance heating ribbons 66a to 66g inclusive. FIGS. 7 and 9 show how the ends of ribbons 66 on the near side of the machine are supported. The ends of the ribbon pair 66a and 66b are connected by a strap 67, on each strap an ear 67a being crimped on a ribbon end. The ends of ribbon pairs 66c, 66d, 66e and 66f are similarly treated. A lug 68 is crimped on the end of the remaining ribbon 66g. Ribbons 66 are covered with a glass cloth strip 69 of which the margins 69a are folded at right angles and adhered to the sides of bar 43. If desired, instead of glass cloth strip 69, a thin metal covering, such as stainless steel foil coated with an electrical insulating substance such as Teflon, may be used.

A rectangular clearance hole 43a is punched through the working surface of bar 43 near each end, leaving a narrow flat surface 43b to which is adhered a fiber sheet 70. To holes 70a in fiber sheet 70 are hooked the outer ends of springs 71a, 71b, 71c and 71d. The inner ends of springs 71a, 71b, and 71c are hooked into holes 67b in straps 67. The inner end of spring 71d is hooked into lug 68. Also secured in lug 68 is one end of a jumper 72, the other end being soldered to contact plate 73 bonded to fiber sheet 70. The above-described construction is duplicated on the far side so that springs 71 on each end of bar 43 maintain continuous tension in ribbons 66, holding them firmly in place despite their expansion and contraction due to heating and cooling.

As shown in FIG. 10, each bar 44 in the lower bar-chain assembly has a flat working surface to which is adhered a rubber sheet 74 covered by glass cloth strip 75 of which the margins 75a are folded at right angles and adhered to the sides of bar 44. Located on each side of the machine near the beginning of the lower horizontal path of contact plates 73 are stationary brushes 76 in the form of leaf springs, one of these being shown in FIG. 1. The free end 76a of each brush 76 is positioned to wipe over contact plates 73 in the manner shown in FIG. 11. As shown in FIG. 1, a fiber wheel 77 with lobes 77a is driven from sprocket shaft 62 through a suitable mechanical connection indicated by dashed line 78. In the path of lobes 77a a contact spring 79 is located so that, as each lobe 77a passes, it forces contact spring 79 into electrical contacting relationship with spring 81. FIG. 12 shows how the above parts and ribbons 66 of a typical bar 43 are connected. A source of electricity 82 is provided to energize the ribbons 66.

To better describe the operation of the machine, the term "cross seal path" will be used for the path traveled by a bar 43 as it mates with a bar 44 to grip and carry the film sheets through the machine, and the term "cross seal time" for the time the mating bars take to travel this path. As each bar 43 starts on the cross seal path, its associated contact plates 73 begin to slide over brushes 76. At this point lobe 77a forces contact spring 79 against contact spring 81, closing the electrical circuit and starting an impulse of current flowing through ribbons 66. This impulse continues to flow during the early part of the cross seal time as contact plates 73 slide over brushes 76. Before contact plates 73 and brushes 76 separate, lobe 77a leaves contact spring 79, springs 79 and 81 separate, ending the impulse of current.

The heat generated in ribbons 66 forms between sheets 10 and 11 under each ribbon 66 a cross seal 83 which cools during the balance of the cross seal time, this process being known as "impulse sealing." FIG. 13 shows that, as a result of cross sealing, the sheets now embody cross channels 84. Each cross seal 83 meets margin seal 15b on the far side of the sheets but ends a short distance away from margin seal 15a on the near side. This leaves a longitudinal access channel 85 communicating with all the cross channels 84.

The film sheets leaving the cross seal unit retain some heat which is largely removed by a blast of air from supply ducts 86 shown in FIG. 1. Part of the heat generated in ribbons 66 is conducted to bars 43 and 44, raising their temperature and thus limiting their capacity to cool the film sheets. Therefore, on the near side of the machine near the return path of bars 43, there is located a supply duct 87 through which cold air is blown into the bars. The cold air flows through the bars and into receiving duct 88 from which it returns to a cold air supply system (not shown). A similar arrangement removes heat from bars 44, the cold air supply duct 89 being shown in FIG. 1. The air ducts are shown in elementary form to simplify the drawings. In practice, they may be large enough to cool all the bars in the upper and lower bar-chain assemblies in their return paths. The cross seal unit described is designed to seal films up to about 10 mils thick or a total thickness of 20 mils. The equipment may be adapted to seal thicker films by using heating ribbons in bars 44 also, giving them the same construction as bars 43. In this way more heat can be delivered to the areas to be sealed.

A first alternate construction for making cross seals is illustrated in FIGS. 14 and 15. Top sheet 90 and bottom sheet 91, joined by margin seals 92a and 92b, pass in turn around pressure roll 93, drum 94 and stripping roll 95, the rolls and drum being driven in synchronism by suitable gearing (not shown). The surface of pressure roll 93 is covered with a rubber layer 93a. Drum 94 is a hollow metal cylinder sealed at each end to a flange 96. Each flange 96 is carried on a shaft 97 having a hold 98 leading to the interior of drum 94.

Looking at FIGS. 16 and 17, it will be seen that a sheet of glass cloth 99 is adhered to drum 94, the glass cloth 99 supporting electric heating ribbons 100 laying parallel to the drum axis. Ribbons 100 are covered by a sheet of glass cloth 101 or thin metal sheet as previously described for bar 43.

Flange 96 carries a fiber ring 102 holding copper contact segments 103. Attached to each segment 103 by screws 104 is a leaf spring 106 to the outer end of which a bent lug 107 is secured by bolt 108. Each lug 107 is crimped on the end of a ribbon 100. This construction is duplicated on the far side of the drum, thus placing each ribbon 100 in tension between two leaf springs 106. A stationary contact brush 109 is located near each end of drum 94 so that it bears on segments 103. A source of electricity is connected to brushes 109, one brush 109 being shown in FIG. 14.

Surrounding the major portion of the outer surface of drum 94 traversed by sheets 90 and 91 is a metal sheet 110 carrying side walls 111, each at right angles to the axis of drum 94, and end walls 112. These sheet metal parts in conjunction with the outer surface of the drum 94 form an air chamber 113 supported by means not shown and supplied with air under pressure through pipe 114.

In operation, as a ribbon 100 passes through the pressure zone between pressure roll 93 and drum 94, the associated segments 103 wipe over brushes 109. This sends an impulse of current through the ribbon 100 and forms a cross seal 115 between sheets 90 and 91. Each cross seal 115 cools as it travels the rest of the way around the drum. Drum 94 may be cooled by pumping fluid through hollow shaft 97.

The air under pressure in chamber 113 forms a blanket that holds sheets 90 and 91 in contact with each other and with drum 94 during the time the cross seals are cooling. Air entering chamber 113 also escapes under side walls 111 and end walls 112, helping to cool the cross seals 115. Air chamber 113 may not be required for sealing relatively thick films. Other means may be used to hold the films in contact during the cooling time if desired. For example, a belt as wide as the film sheets may be arranged to partially encircle the outside of the drum, the belt being arranged to travel in a closed path and kept in tension so as to exert pressure on the film sheets.

A second alternate construction for making cross seals is shown in FIG. 18. Top sheet 120 and bottom sheet 121 pass around pressure roll 122, drum 123 and stripping roll 124. Rolls 122 and 124 are of metal covered respectively with rubber layers 122a and 124a. Drum 123 is carried on flanges 125 and is fluid cooled through pipes, not shown. As shown in FIG. 19, drum 123 has adhered to its outer surface a glass cloth 126 supporting a sheet metal covering 127 of low conductivity metal, such as Nichrome, from one to 10 mils thick. A hollow metal heater roll 128, carried on hubs 129, supports lengthwise bars 130 which are pressed against sheet metal covering 127 as roll 128 rotates. Roll 128 is driven so that the peripheral speed of bars 130 is the same as that of sheet metal covering 127.

In operation, heater roll 128 may be heated by circulated hot oil or by an inserted electric resistance heater (not shown). The bars 130 "print" or transfer transverse lines of heat to the sheet metal covering 127. This heat is stored, then transferred by conduction to sheets 120 and 121, forming cross seals in a manner known in the art. If desired, margin seals may be made in the same operation. This may be done as outlined in FIGS. 20 and 21 by attaching a disc 132, preferably of brass, to each hub 129 by bolts 133. Disc 132 is also shown as an optional element in dashed lines in FIG. 19. If desired, an air chamber or partial circumferential belt may be added to the construction to hold the film sheets in contact with each other and with the drum 123, as described in connection with FIG. 14.

After being cross sealed by one of the methods described above, the sheets pass into what will be termed the embossing unit, now to be described. In the preferred form of the invention shown in FIGS. 1 and 2, sheets 10 and 11 leave bars 43 and 44 and pass between radiant heaters 141 which raise their overall temperature to the vicinity of the softening point. The sheets then pass between and are embossed by male roll 142 and female roll 143. Male roll 142 comprises flanges 144 carried on shaft 145. Flanges 144 support cylinder 146, the surface of which is coated with a rubber layer 147, shown in FIGS. 22 and 23. On rubber layer 147 is bonded a sheet of thin metal 148, such as copper, formed into a pattern of bosses 149, leaving spaces between the bosses and rubber layer 147. If desired, these spaces may be filled with rubber. Female roll 143, comprises flanges 151 carried on shaft 152. FIGS. 23 and 24 show how the flanges 151 support lengthwise bars 153 and annular bars 154, forming a grid with rectangular openings that receive bosses 149. The embossing roll 142 may be heated, if desired, by radiant heater 157.

Sheets 10 and 11 are presented to the embossing rolls so that cross seals 83 fall on bars 153. Sheets 10 and 11 are embossed at the same time forming, between adjacent cross seals 83, a row of embossments 158a in sheet 10 and 158b in sheet 11. FIGS. 25 and 26 show how the embossments are separated by unembossed discontinuous strips 159 running lengthwise of the sheets, and by seals 83 running cross wise of the sheets, which now form a prefab. If the temperature of the film sheets is properly controlled, they do not adhere to each other after embossing. However, if desired, a release agent may be applied to the contacting sides of sheets 10 and 11 before film fabrication begins.

An alternate embossing method using a vacuum is shown in FIGS. 27 and 28. Top sheet 170 and bottom sheet 171 pass between and are softened by radiant heaters 172, then pass around feed roll 173, embossing roll 174 and stripping roll 175. Embossing roll 174 comprises two flanges 176 turning on a stationary hollow shaft 177. Flanges 176 support a metal cylinder 178 shown in FIG. 30. As shown in FIGS. 29 and 30, cylinder 178 is covered with an insulating rubber layer 179 having depressions 180 formed therein. From each depression 180 a port 181 leads through the rubber layer 179 and cylinder 178. In the interior of the cylinder, as shown in FIG. 30, stationary hollow shaft 177 has a port 182 connected to a manifold 183 in a stationary shoe 184 supported by shaft 177. The interior surface of cylinder 178 slides over shoe 184. Thus, vacuum may be applied to sheets 170 and 171 forming, as shown in FIG. 29, embossments 185a in sheet 170 and 185b in sheet 171. The rubber layer 179 prevents undue loss of heat from the film sheets and helps give short start-up time.

The configuration of embossments produced by either method described above and shown, for example, in FIGS 25 and 26, is only suggestive. They may be made in any convenient size and shape desired and arranged in any convenient number per square foot of film structure as long as they are aligned in longitudinal rows and in transverse rows between the cross seals. Embossments, for example, in the form of truncated pyramids with either a square or oblong base may be more useful than those shown, especially where heavy objects are to be cushioned. Also, cushioning with such embossments offers more contact area where it is desired to adhere the cushioning to corrugated board or paper. After embossing, the film structure constitutes a prefab which may be wound into a roll (not shown) for shipment to the user who can then convert it into finished cushioning. During the winding process the embossments are crushed and compacted, giving the roll high density.

The conversion equipment for making air cell cushioning from the prefab is shown for the preferred form of the invention in FIGS. 31 and 32. Sheets 10 and 11 are inflated through access channel 85, pass around wheels 187 on shaft 188, travel around cylinder 189 on rings 190, during which travel they are long sealed by tape strands 191 and finally pass under discs 192 on shaft 193. FIG. 33 shows how access channel 85 is formed into the semblance of a tube which is slipped over pipe 186. As shown in FIG. 34, pipe 186 has a lengthwise row of slots 194 facing the center of the prefab. Air under pressure is forced through the pipe 186, out slots 194, through access channel 85 and cross channels 84. The air lifts each embossment 158a in sheet 10, reversing its configuration from concave to convex, thus giving, with its mating embossment 158b, an inflated air cell, shown in FIG. 35. In FIG. 31 the embossment 158a is shown partly lifted as it is being inflated. By altering the pressure of the air feed to pipe 186, the pressure within the air cells may be adjusted to provide any desired degree of resiliency. Also, if desired, a gas other than air can be utilized to inflate the cells.

A knife 195, shown in FIG. 34, on the side of pipe 186 cuts sheets 10 and 11 apart at their near side margin so that the sheets may pass over the pipe. Sheets 10 and 11 with cells 158 inflated now pass around wheels 187, the discontinuous strips 159 riding on the rims of the wheels. The pressure between strips 159 and wheels 187 seals off cells 158, retaining air in the cells during the passage of the sheets around the wheels. The rings 190 on which sheets 10 and 11 travel around cylinder 189 are illustrated as being made of rubber, but may be made of metal if desired. The rings are suitably spaced along the cylinder axis and bonded to its surface as shown in FIG. 35. Each end of cylinder 189 is carried on a flange 196 fixed on a shaft 197.

As the sheets travel around the cylinder on rings 190 they pass under tensioned parallel tape strands 191. Tape strands 191 ride on the sheets, pressing them against rings 190 through any convenient arc of travel, in this case about 30°, then leave the sheets and travel around discs 192 on shaft 193, heater roll 200 on hollow shaft 201, around fiber discs 198 on shaft 199, then back to the film sheets. The tape forming strands 191 is endless and is wound around the assembly of discs 198, discs 192 and heater roll 200 in helical fashion. From the portion 191b at the end of its helical path on the near side of the machine, the tape is returned, as shown at 191a, to the beginning of its path and kept in tension by a suitable arrangement of pulleys (not shown).

The tape is preferably stainless steel, about 1/8 inch wide and from one to 10 mils thick. Its section may be rectangular but is preferably trapezoidal, as shown in FIG. 36, with the widest side 191c contacting the film sheets. Such tape is a standard production item and readily available.

Shafts 193, 199 and 201 are journalled at each end in a plate 202 and turned by means not shown to drive tape strands 191 at the surface speed of rings 190. Tape strands 191 are kept in their paths by tracking pins 203 held in bars 204 supported by plates 202. If desired, plates 202 with the whole tape transport mechanism may be arranged to lift vertically to facilitate servicing. The unit stress in the tape being well within the elastic limit, the predictable life of the tape is indefinitely long, of the order of decades.

Heater roll 200 is maintained at a temperature near the softening point of the film by inserted electric heaters (not shown) or by circulated hot oil. The hot tape strands 191 leaving the heater roll 200 retain heat as they pass around fiber discs 198. Then, as they begin their ride on top sheet 10, most of the heat stored in the tape strands is transferred to strips 159, forming long seals 159a. Because of the trapezoidal section, more heat is stored near the center of the tape and, therefore, more heat is transferred to the center of each strip 159. This gives a desirable heat distribution across the cross seal section and helps maintain the strength of the film at the edge of the seal. Thus, this construction makes available a novel and efficient method of longitudinal impulse sealing.

To prove the effectiveness of this sealing method, apparatus of this type was constructed to make the long seals. The apparatus was comprised of a drum 14.5 inches in diameter and 3 inches wide made from 18 gauge sheet steel and the 3 inch periphery covered with cotton cloth. The drum was mounted for free rotation on a horizontal shaft.

A tape 5/32 inch wide and 9 feet long was cut from a coil of Grade A spring temper phosphor bronze sheet 2 mils thick as manufactured by The T. E. Conklin Brass & Copper Co., Inc. This tape was formed into a loop by soldering the ends together. A system of four wheels was used to carry approximately half the tape in a 180° wrap around the cloth-covered surface of the drum, one of the wheels being driven by a motor. The other half of the tape loop was carried over an adjustably mounted wheel used to regulate the tension in the tape, the tension being read by a spring balance. No release agent was used on the tape or on the cloth covering the drum.

Between the wheel feeding the tape to the drum and the point of contact of the tape with the drum, a length of 6 inches of tape was heated by two parallel coils of Nichrome wire 10 mils in diameter, the coils being spaced about 1/4 inch from the tape. The coils were each 1/8 inch outside diameter, 6 inches long, and carried 24 turns per inch. The coils were connected in series to a 120 volt supply and placed within a semicylindrical polished sheet metal reflector.

This apparatus made perfect long seals between two sheets of 1 mil thick polyethylene sheet when operated at a rate of 27 feet per minute. The tape tension did not seem to be critical and could be varied from 0.8 pound to 2 pounds without any apparent effect upon the quality of the long seal.

As the film sheets leave rings 190, each air cell 158 is now sealed on all sides. The pressure and temperature of the air forced through pipe 186 will affect the firmness of the cells. The colder the air, the more it will expand as it subsequently rises to room temperature and the firmer will be the cells. Thus, the equipment can operate at atmospheric pressure and make cushioning having internal air pressures in the cells above atmospheric pressure, producing tension in the cell walls, and giving maximum cell volume. For a given cell configuration, therefore, this process can produce, at atmospheric pressure, the maximum cushioning volume per pound of film used.

The air cell cushioning is now complete as made by the preferred form of the invention operating on two sheets of film. If desired, the prefab-making equipment shown in FIG. 1 may be combined with the conversion equipment shown in FIG. 31 giving one integrated machine for direct production of finished cushioning. Automatic lengthwise-slitting and cutting-to-length devices may be added to the machine if desired.

Another way to use the invention is to supply the prefab-making equipment shown in FIG. 1 with a flattened film tube from a supply roll or directly from an extruder, thus producing a prefab with margins already joined. In this case, the margin sealing equipment shown in FIG. 1 need not be used.

Still another way to use the invention is to omit the margin sealing devices shown in FIG. 1 and supply the equipment with two sheets of film, thus producing a prefab with margins unsealed. The equipment for converting such a prefab into cushioning differs from that shown in FIG. 31 only in that portion used for inflating the cells. Therefore, only this portion of the equipment will be described and is shown in FIGS. 37, 38 and 39, associated with certain other parts shown in FIG. 31, therefore given the same designations. These parts are the pipe 186, the wheel 187, and the shaft 188.

On each side of the machine a pulley 206 on the near side end of driven shaft 188 drives upper belt 207 which passes over idler pulley 208. Below shaft 188 a pulley 209 on driven shaft 211 carries lower belt 212 which passes over idler pulley 213. The margins of sheets 214 and 216 are pressed together and carried forward by belts 207 and 212. As shown in FIGS. 38 and 39, on the near side of the machine the sheets are spread apart between their margins and the ends of the cross seals 217 to accomodate air delivery pipe 186. FIG. 37 shows how embossments 218a in sheet 214 and 218b in sheet 216 are separated by air pressure to form cells 218.

Although the heater roll 200 shown in FIG. 31 heats the tape strands by conduction, other heating methods may be used if desired. For example, as a first optional method, roll 200 may be unheated and a radiant heater (not shown) located near the tape strands as they pass from roll 200 to discs 198. Or, as a second optional method, the tape strands may be passed through a horizontal air duct mounted across the machine, hot air being forced through the duct to heat the tape strands.

A third optional construction for heating the tape strands is shown in FIG. 40. This is designed for tape of rectangular section, the vertical strands being shown at 250. The strands are heated by roll 251 on hollow shaft 252 in which an electric heater (not shown) may be inserted or through which hot oil may be pumped. As shown in FIG. 41, there are formed on the surface of roll 251 parallel circumferential ridges 253 adapted to heat only the central part of tape strands 250. Thus, more heat may be stored in the center of the tape strands giving a long seal of desirable characteristics.

An alternate construction for making long seals is shown in FIG. 42 with auxiliary devices omitted. This uses tape strands above and below the film sheets as the sheets travel over a cylinder. The construction is the same as that shown in FIG. 31 with the addition of tape strands below the film sheets. Therefore, the principal parts shown in FIG. 31, except the film sheets designated in that drawing, are reproduced in FIG. 42 and require no further description.

In FIG. 42, top sheet 259 and bottom sheet 260 with cells 261 inflated pass under wheels 187. After leaving wheels 187 the sheets pass between hot upper tape strands 191 and hot lower tape strands 262 which travel around cylinder 189 on the rubber rings 190. As lower tape strands 262 leave rings 190 they pass in helical fashion around solid roll 263, heater roll 264 and back to rings 190 in a manner similar to that described for tape strands 191 in FIG. 31. FIG. 43 shows the relation of the parts while long seals are being made. This method is well adapted to long sealing relatively thick films because heat is applied to both films where they are to be heat sealed.

A second alternate construction for making long seals is shown in FIG. 44. This uses tape strands above and below film sheets traveling in a straight line. Top sheet 300 and bottom sheet 301 pass between and are carried to the right by upper tape strands 302 and lower tape strands 303. The endless tape forming upper strands 302 passes in helical fashion around fiber discs 304, discs 306, solid roll 307, heater roll 309, then returns to discs 304 in the general manner described for tape strands 191 in FIG. 31.

Lower tape strands 303 are similarly associated with fiber discs 311, discs 312, roll 313 and heater roll 314. Stationary shoes 316 supported by transverse bar 317 and stationary shoes 318 supported by bar 319 press tape strands 302 and 303 respectively against film sheets 300 and 301, sealing off the air cells 320. The relative position of the parts during the sealing process is shown in FIG. 45. This method is also adapted to sealing relatively thick films.

Figure 46:
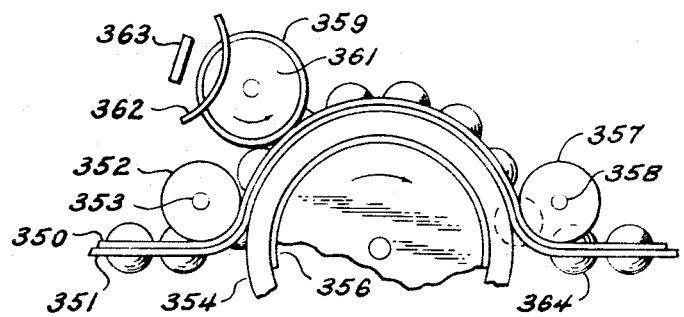
FIG. 46 is an end elevation of a third alternate construction for making long seals using heated wheel rims, the film sheets traveling over a cylinder.

A third alternate construction for making long seals uses the mechanism shown in FIG. 46. This uses wheels, each one similar to wheel 13 in FIG. 3, with heated rims that apply heat to the strip areas to be long sealed. Top sheet 350 and bottom sheet 351 pass under discs 352 on shaft 353, over rubber rings 354 on cylinder 356 and under discs 357 on shaft 358. The thin metal rims 359 on fiber or rubber wheels 361 pass through slots (not shown) in metal reflector 362 so that rims 359 receive radiation from heater 363. Heat stored in rims 359 is transferred to film sheet 350, thence to sheet 351, forming long seals separated by air cells 364.

Other methods may be used to heat the wheel rims 359. They may be arranged to pass through slots in a horizontal air duct crosswise of the machine (not shown) and heated by hot air forced through the duct. The wheel rims may be arranged to run against a heated roll, picking up heat by conduction, or they may be heated by a high frequency device.

Long seals may also be made by other methods than those described. Jets of hot air may be directed against the strip areas to be heat sealed followed by pressure rolls to squeeze the hot film together, or ultrasonic energy may be applied to the strip areas to be heat sealed. These methods are known in the art.

Figure 48:
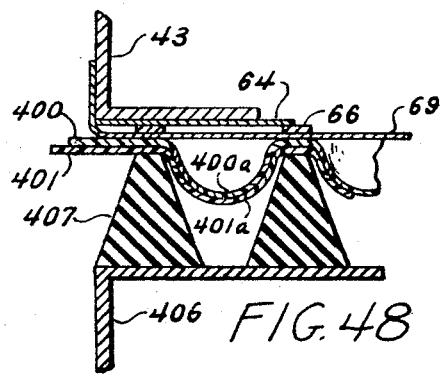
FIG. 48 is a sectional detail showing how the bars in the lower bar-chain assembly of FIG. 1 are modified for use with the construction of FIG. 47.
Figure 47:
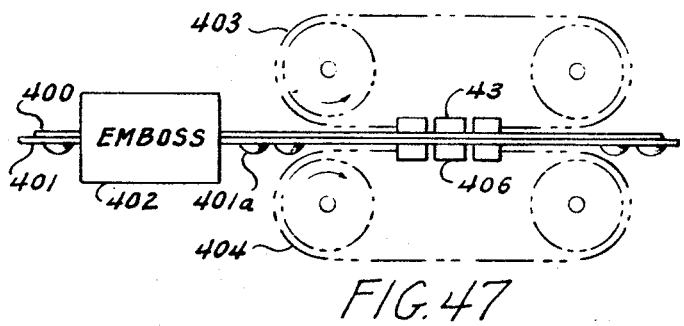
FIG. 47 schematically illustrates an alternate construction for making a prefab. This uses, in sequence, embossing and cross sealing with bar-chain assemblies.

An alternate construction for making a prefab is shown in FIGS. 47 and 48. This uses, in sequence, embossing and cross sealing. Top sheet 400 and bottom sheet 401 are embossed by equipment such as is shown in FIG. 1, this being indicated by block symbol 402. The embossments produced are designated 400a and 401a. The embossed sheets pass into the cross seal unit comprising upper bar-chain assembly 403 and lower bar-chain assembly 404. The bars in the upper bar-chain assembly 403 are built the same as the corresponding bars in FIG. 1 and are given the same designation 43. In FIG. 48 are detailed a portion of a bar 43, the associated glass cloth 64, heating ribbons 66 and glass cloth 69.

Each bar 406 in the lower bar-chain assembly 404 carries lengthwise rubber ridges 407 which pass between embossments 401a and press the transverse unembossed portions of the film sheets against the glass-cloth-covered heating ribbons 66 while the cross seals are being made. This equipment may be used as described or suitably modified as outlined before to produce prefabs from either sheet or tube stock. Any prefab thus made may be converted into air cell cushioning using a suitable method previously described.

Figure 49:
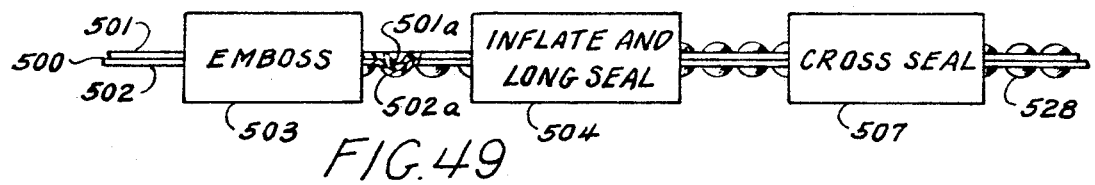
FIG. 49 schematically illustrates an alternate construction for making air cell cushioning. This uses, in sequence, embossing, long sealing and cross sealing with bar-chain assemblies.
Figure 50:
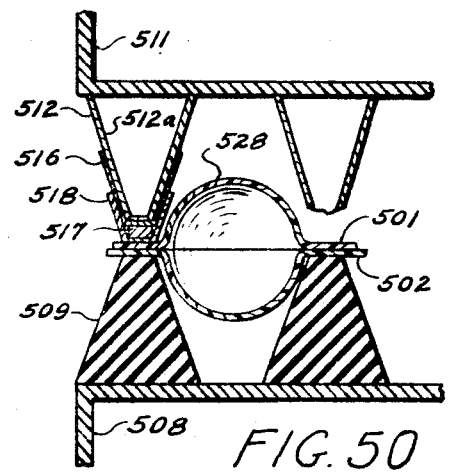
FIG. 50 is a partial section showing modifications of the bars in the upper and lower bar-chain assemblies of FIG. 1 to adapt them to the construction of FIG. 49.

An alternate construction for making air cell cushioning is shown in FIG. 49. This uses, in sequence, embossing, long sealing and cross sealing. To simplify the description it will be assumed that the equipment is supplied with a flattened film tube 500 pictured as top portion 501 laying on bottom portion 502. The tube 500 first passes through embossing unit 503, then through inflation and long sealing equipment shown by symbol 504, this being one of the types described before, such as that shown in FIG. 31. Tube 500 now passes through a cross seal unit shown by symbol 507 comprising upper and lower bar-chain assemblies having the general construction shown in FIG. 1 except that, as shown in FIG. 50, each bar 508 in the lower bar-chain assembly has lengthwise rubber ridges 509 and each bar 511 in the upper bar-chain assembly has attached sheet metal portions 512. A section on each portion 512 is in the form of a triangle having sides 512a. The flattened apex of portion 512 is covered with a glass cloth strip 516 against which heating ribbon 517 is held by glass cloth strip 518.

This construction thus maintains heating ribbons 517 in a plane parallel to and spaced from bar 511. A suitable similar construction (not shown) holds tension springs and contact plates associated with heating ribbons 517 in the same plane as ribbons 517, these parts functioning in the manner described for FIG. 9. The completed cushioning, with cells 528 completely sealed, is shown leaving the cross seal unit 507. It was previously noted that a flattened film tube was fed to this equipment, but separate sheets may be used, if desired. If so, the margins may be sealed prior to embossing or the margins may be left unsealed and suitable equipment such as that shown in FIGS. 37 and 44 used for inflation and long sealing.

Figure 51:
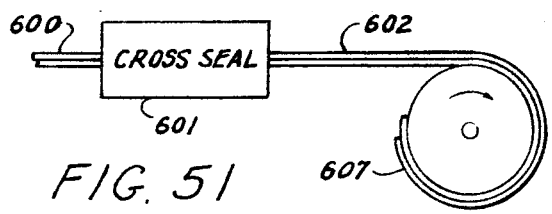
FIG. 51 shows a construction for making a prefab suitable for fabricating into air cell cushioning by bunch folding.
Figure 52:
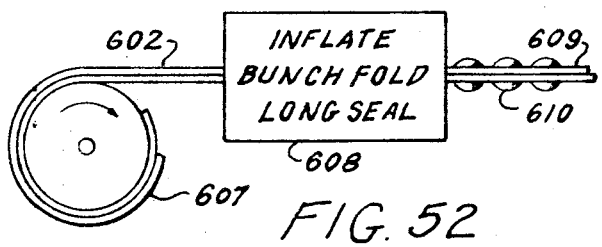
FIG. 52 schematically illustrates a construction for converting the prefab mentioned directly above into air cell cushioning by bunch folding.
Figure 53:
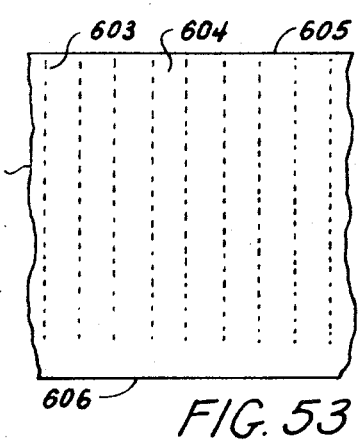
FIG. 53 is a plan view of a portion of the prefab made by the construction of FIG. 51.

An alternate construction for making a prefab using only cross sealing is shown in FIG. 51, and a method using "bunch folds" for converting this prefab into air cell cushioning is shown in FIG. 52. Again, to simplify the description, it will be assumed that a flattened film tube 600, pictured as two sheets, is supplied the equipment. The tube 600 passes through a cross seal unit such as that shown in FIG. 1, this being shown by symbol 601. As detailed in FIG. 53, this makes a prefab 602 with cross seals 603 and cross channels 604 starting at the far edge 605 of the tube. Cross seals 603 end a short distance away from the near edge 606. FIG. 51 shows the prefab 602 wound into a roll 607 for convenience in shipment.

Figure 55:
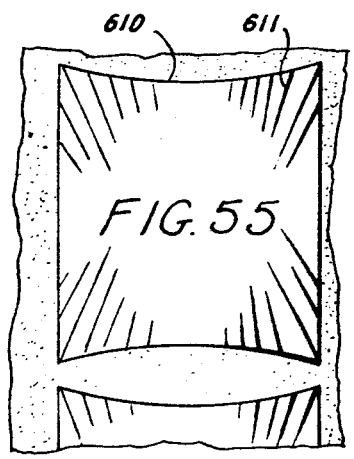
Figure 54:
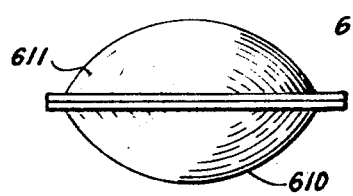
FIG. 54 is an elevation and FIG. 55 a plan of an air cell in the cushioning made by the construction shown in FIG. 52.

In FIG. 52, prefab 602 unwinds from roll 607 and passes through long seal equipment such as that shown in FIG. 31, this being pictured by symbol 608. As cross channels 604 are inflated, they are converted into film tubes (not shown) extending across the film structure. The equipment 608 presses the walls of the film tubes together on the long seal lines forming finished cushioning 609 with sealed cells 610 by a method known in the trade as "bunch folding." A typical cell 610 thus formed is detailed in elevation in FIG. 54 and in plan in FIG. 55, the wrinkles or bunch folds being indicated at 611.

The formation of the transverse film tubes during the inflation process causes the film tube to shrink along its length. Thus, for each ten linear feet of finished cushioning 609 leaving the equipment 608, from 12 to 15 feet of prefab 602 may be drawn from supply roll 607, depending on the degree of inflation of the cells. If desired, the equipment shown in FIGS. 51 and 52 may be combined to form one machine for making air cell cushioning.

Figure 57:
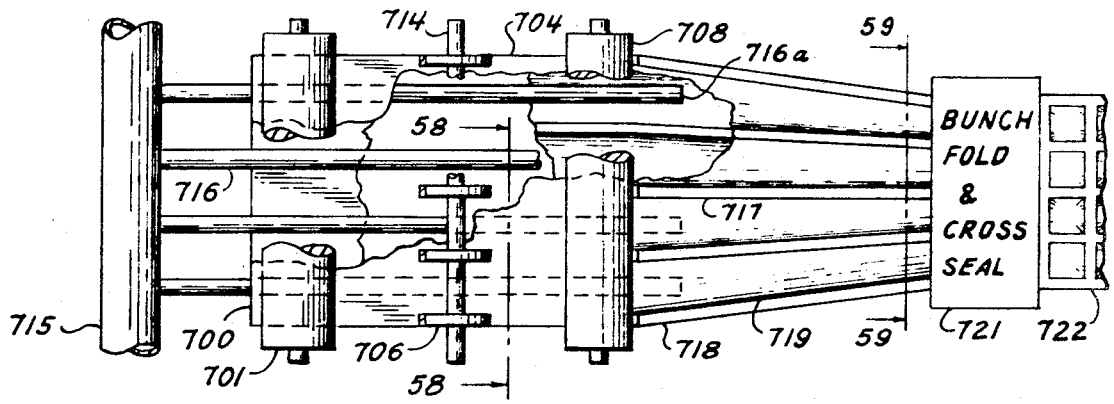
FIG. 57 is a plan view, partially broken away, taken along line 57—57 in FIG. 56.
Figure 56:
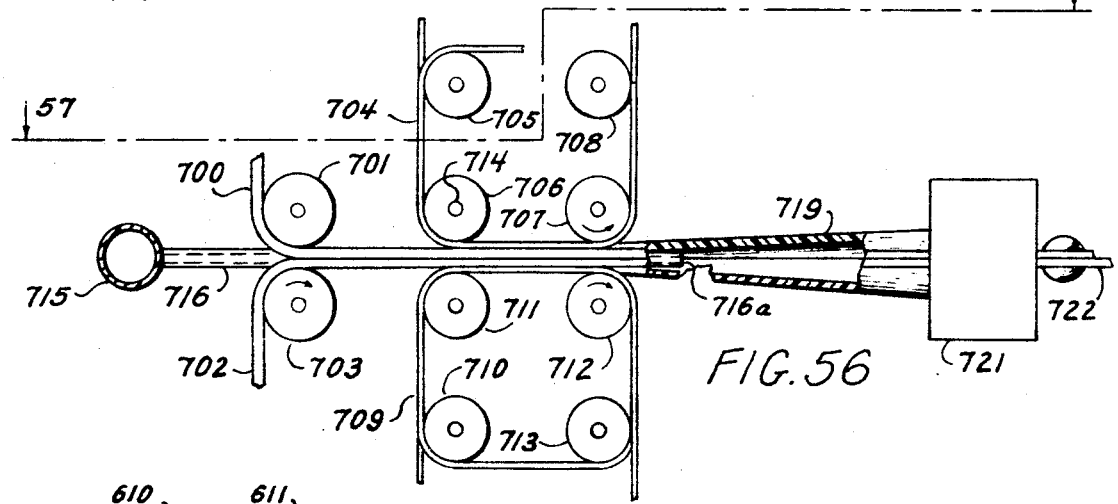
FIG. 56 is a front elevation, partially in section, of a construction for making either an air cell cushioning or an elastomer-filled cushioning. This uses, in sequence, long sealing and cross sealing with bunch folding.

A construction that can make an air cell cushioning or an elastomer-filled cushioning is shown in FIGS. 56 and 57. It employs a long seal mechanism similar to that shown in FIG. 44. Top sheet 700 enters the equipment around roll 701 and bottom sheet 702 enters around roll 703. Upper tape strands 704 pass around and receive heat from heater roll 705, then pass around and are pressed by fiber discs 706 against sheet 700, pass around discs 707 and roll 708, then return to heater roll 705. Lower tape strands 709 are similarly associated with heater roll 710, fiber discs 711, discs 712 and roll 713. Necessary auxiliary devices, previously described, are omitted. Discs 706 are carried on shaft 714. Discs 707, 711 and 712 are similarly supported, but their associated shafts are not designated.

Figure 58:
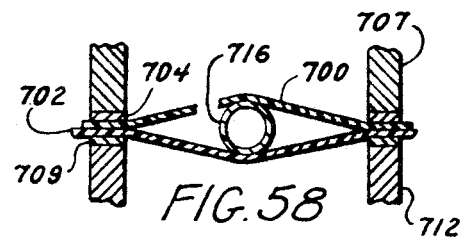
FIG. 58 is a partial section on line 58—58 and FIG. 59 a partial section on line 59—59 in FIG. 57.

Connected to header 715 are pipes 716 located between film sheets 700 and 702 in the horizontal plane of and between the sealing portions of the upper and lower tape strands. Pipes 716 extend through the mechanism, their ends being shown at 716a. As shown in FIGS. 57 and 58, the tape strands make long seals 717 on each side of each pipe 716, forming long channels, not designated, between long seals 717. The tape strands also make margin seals 718.

Figure 59:
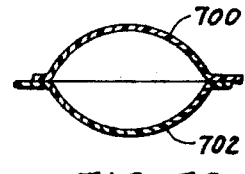
Figure 60:
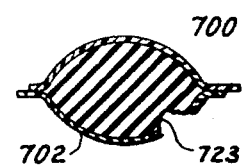
FIG. 60 is a section of a cell in an elastomer-filled cushioning made by the construction shown in FIG. 56.

As the film sheets travel past pipe ends 716a, air forced through the pipes inflates the long channels into film tubes 719, each having a section as shown in FIG. 59. The formation of film tubes 719 causes the film structure to shrink in width as shown in the plan view, FIG. 57. The film structure now passes through a cross seal unit similar to that shown in FIG. 1, but having bars modified as shown in FIG. 50, this unit being shown by symbol 721. This cross seals and bunch folds the film tubes 719, giving finished air cell cushioning shown at 722. The pipes 716 may be used to force a paste or foam elastomer 723 into the tubes 719 instead of air, giving a section through a cell of the finished product the appearance of FIG. 60.

Figure 61:
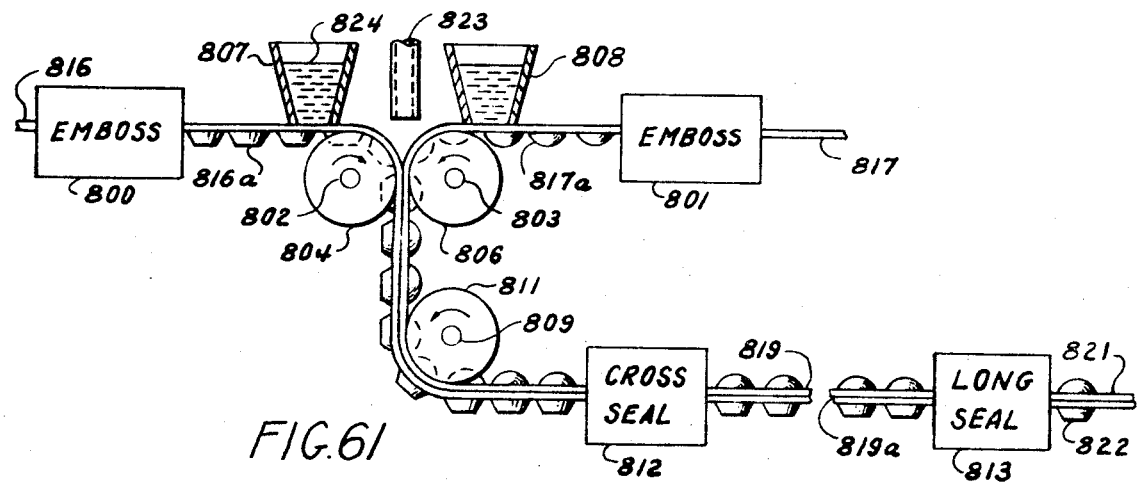
FIG. 61 is a schematic view, partially in section, of an apparatus which may be used to make a prefab, an air cell cushioning or an elastomer-filled cushioning, any of which may have embossments on one side differing in shape from those on the other side. This uses, in sequence, embossing, cross sealing and long sealing.

A construction that can make a prefab, an air cell cushioning or an elastomer-filled cushioning is shown in FIG. 61. This comprises a sequence of embossing, cross sealing and long sealing units. It includes embossing units 800 and 801 which may be similar to that shown in FIG. 1. If desired, the embossments made by unit 800 may differ in shape from those made by unit 801. The construction also includes two parallel, adjustably-spaced driven shafts 802 and 803 carrying, respectively, disc assemblies 804 and 806. It includes two reservoirs 807 and 808 and a third driven shaft 809 carrying discs 811. It includes a cross seal unit 812 which may be similar to that shown in FIG. 1 but with the bar constructions illustrated in FIG. 50 and a long seal unit 813 such as that shown in FIG. 31 modified by adding the inflation mechanism of FIG. 37.

To make the prefab, reservoirs 807 and 808 need not be used and are empty. A first sheet of film 816 is fed through embossing unit 800, receiving embossments 816a in a form selected for illustration as a truncated pyramid with square base, under reservoir 807 and over discs 804. A second sheet 817 is fed through embossing unit 801, receiving embossments 817a having the same base configuration as embossments 816a but with a rounded outer profile, under reservoir 808 and over discs 806.

Sheets 816 and 817 are pressed together as they pass between discs 804 and 806, the embossing units being synchronized so that each embossment 816a in sheet 816 mates with and totally communicates with an embossment 817a in sheet 817. The two sheets now travel together around discs 811 and through cross seal unit 812 forming a prefab indicated at 819 which may be wound into a roll (not shown) for shipment. As the margins are not sealed, the air in the mating embossments will be expelled through the spaces between the cross seals and the embossments will be collapsed, giving a roll of high density.

For direct production of air cell cushioning, the prefab, indicated at 819a, continues its travel, going through long seal unit 813, emerging as finished cushioning 821 with individually sealed cells 822. Inflation during long sealing is not necessary, but is desirable to assure firm cells. If desired, air may be blown through the pipe 823 to help maintain the shape of the embossments prior to the sealing operation.

Figure 62:
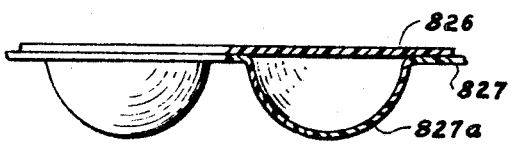
FIG. 62 is an elevation, in partial section, of an air cell cushioning with one unembossed or flat side which may be made by the construction shown in FIG. 61.

This equipment can also make air cell cushioning with one unembossed or "flat" side by making one embossing unit, such as 800, inoperative. FIG. 62 shows such a product as a first sheet 826 paired with a second sheet 827, the latter having embossments 827a. This is useful in making packages or containers because the flat side may be more readily adhered to a sheet of paper, cardboard or corrugated board. If desired, sheet 826 may be made thicker and of more rigid material than sheet 827 and the resultant product made directly into containers.

To make an elastomer-filled cushioning, the reservoirs 807 and 808 are filled with a paste or foam elastomer 824. As the sheets travel beneath the reservoirs, the embossments in each sheet are filled with elastomer 824. The structure then passes through the cross seal unit 812 and long seal unit 813, completing its fabrication. An elastomer-filled cushioning with one flat side may also be made, if desired, as explained in connection with FIG. 62.

Optionally, the elements of the construction shown in FIG. 61 may be rearranged to make cushioning with the cells filled with air or elastomer. This may be done by reversing the positions of cross seal unit 812 and long seal unit 813 and needs no illustration.

Figure 63:
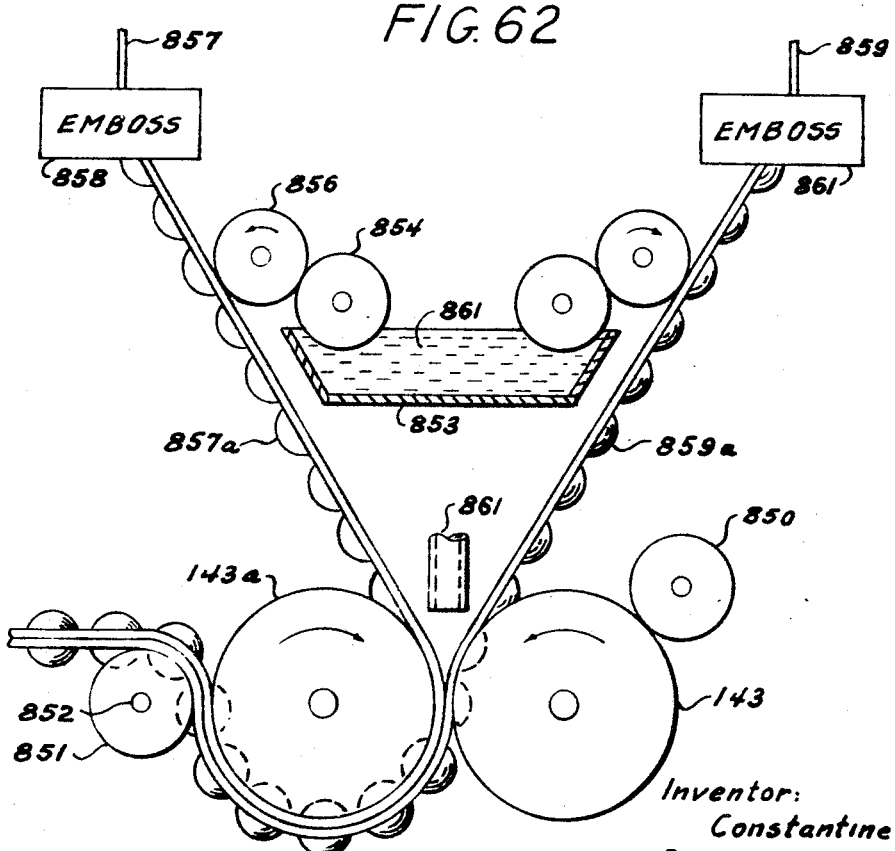
FIG. 63 is a schematic front elevation, partially in section, of an alternate construction for making either an air cell cushioning or an elastomer-filled cushioning. This uses either embossing followed by simultaneous long and cross sealing with heat or embossing followed by long and cross sealing with adhesive.
Figure 67:
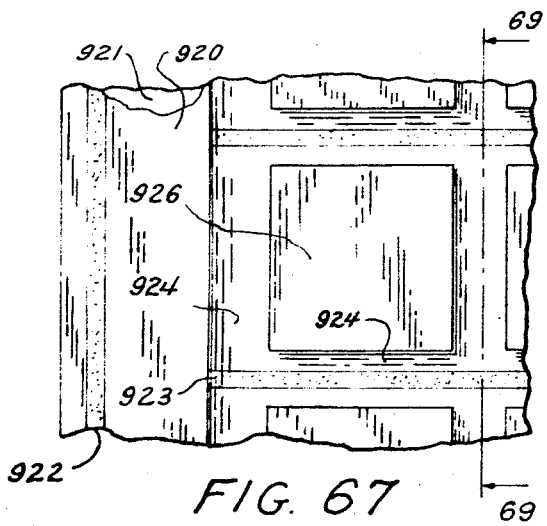
FIG. 67 is a plan of a portion of a prefab showing a cell construction in which a large part of the film forming the cell walls is unaltered by the embossing process.

Another alternate construction for making air cell cushioning or elastomer-filled cushioning is shown in FIG. 63. This uses embossing followed by simultaneous long and cross sealing or by adhesive application. Certain parts already described in detail have been given the same designations previously used. Both roll 143 and 143a in FIG. 63 have the same construction as female roll 143 shown in FIG. 1 and in detail in FIG. 24 with lengthwise bars 153 and annular bars 154 forming a grid with rectangular openings in the outer portion of the roll. A heater roll 850 is located so as to roll against the bars forming the surface of roll 143 in FIG. 63. Rolls 143 and 143a are driven by suitable gearing (not shown) so that each bar 153 in roll 143 contacts its counterpart in roll 143a. A row of discs 851 on shaft 852 is located adjacent to roll 143a.

Adhesive coating equipment is provided including reservoir 853, dip rolls 854 and coating discs 856. A first sheet 857 is passed through embossing unit 858, this unit being of the type shown in FIG. 1, producing embossments 857a. A second sheet 859 is similar processed, producing embossments 859a. The embossing units are synchronized so that each embossment 857a is brought into mating and totally communicating relationship with an embossment 859a as the sheets pass between rolls 143 and 143a.

To make heat sealed cushioning, the adhesive coating equipment is made inoperative and the heater roll 850 brought up to operating temperature. Sheets 857 and 859 are presented and passed through rolls 143 and 143a so that the bars 153 and 154 are aligned with the unembossed areas of the sheets, thus making both long and cross seals at the same time, the openings between the bars allowing passage of the embossments in the sheets. The seals thus formed cool as they travel around the surface of roll 143a and around discs 851. If desired, the working surfaces of the bars in roll 143a may be covered with a layer of rubber to better distribute the sealing pressure. If the sheets being processed are relatively thin, that is, of the order of 1 mil thick, the embossments 857a and 859a may not retain their shape well enough to give cells of the desired firmness. In this case, air may be blown into the embossments through nozzle 861 as they enter rolls 143 and 143a, assuring firm cells.

To make cushioning using adhesive, heater roll 850 is made inoperative and adhesive 861 placed in reservoir 853. As sheets 857 and 859 pass through the equipment, they are coated with adhesive by coating discs 856, then are pressed together by rolls 143 and 143a. Cushioning with one flat side may be made as explained in connection with FIG. 61. To make cushioning with an elastomer filling, a paste or foam elastomer may be supplied through nozzle 861. Either heat sealing or adhesive application may be used to seal off the cells.

Another alternate construction for making a prefab is shown in FIGS. 64 and 65. This uses reciprocating tables with an operating sequence of cross sealing, then embossing. A film tube 900, pictured as two sheets, is drawn at constant speed through reciprocating tables adapted to cross seal and emboss the tube. In FIG. 64, piston rods 901 are fixed to lower table 902 which is carried on shoes 903 that slide on stationary ways 904. As detailed in FIG. 66, attached to each piston rod 901 is a piston 906 sliding in cylinder 907 which is attached to the upper table 908. Lower table 902 is covered with a rubber pad 909. The tables 902 and 908 may slide to the left, the respective alternate positions being designated 910 and 911. The lower surface of table 908 is divided along its length into four working sections 908a, 908b, 908c and 908d, of equal length. Sections 908a, 908c and 908d may be heated to controlled temperatures by devices not shown while section 908b is not heated or may be cooled by circulated fluid.

Section 908a carries any convenient number, in this case four being shown, of cross seal bars 912a adapted to make part of each of four cross seals 913, starting at margin 900a on the far side of the film tube and extending toward its center a distance equal to one third of its width. Section 908a also carries four cross seal bars 912b transversely aligned with bars 912a and adapted to make another part of each of the four cross seals 913, starting a short distance from the near margin 900b and extending toward the center of the film tube a distance equal to about one-third its width. Section 908c carries cross seal bars 914 located in spaced relationship to bars 912a and 912b. Section 908d carries bosses 915 arranged in lengthwise and transverse rows, the transverse rows of bosses being located in spaced relationship with cross seal bars 912a, 912b and 914.

In operation, film tube 900 is drawn to the right at constant speed by devices not shown. Air is forced into the space below and exhausted from the space above pistons 906 when the tables are in positions 910 and 911. The tables close and move to the right with the film tube at the same speed as the tube for a distance equal to about two-thirds the length of one section such as 908a. The tables then open and return to starting position with a quick-return motion at about twice the speed they moved to the right, thus enabling the table sections to operation continuously on the film tube. Thus, portions of the film tube 900 are progressively cross sealed with the pattern shown in FIG. 53, then embossed so that the embossments lie between the cross seals and have a cross section of the general form shown in FIG. 26. The prefab thus made may be wound into rolls for later conversion into air cell cushioning by any suitable method previously described.

In a freshly formed cross seal, the film substance at the seal line is hot and soft, lowering the tensile strength of the film tube. Cross sealing only part of the film tube at one time enables the tension established in the film tube to be transmitted always by one relatively cool section.

An operation sequence of embossing followed by cross sealing may be obtained, if desired, by locating bosses 915 in section 908a, bars 912a in section 908b, and bars 914 in section 908d. With this equipment a prefab may be made from separate film sheets, if desired, then converted into cushioning by suitable methods previously described.

The previous description covers some of the more useful types of cell construction. However, the versatility of the heat sealing methods allow many other useful types of cell construction to be made. These will now be outlined.

In the embossing methods described, the film in each cell wall was altered and made thinner than it was originally. The product of these methods will be called the "embossed cell construction." In contrast, in the cell construction shown in FIGS. 67, 68, 69 and 70, the film in each cell wall is largely unaltered by the embossing action. Top sheet 920 and bottom sheet 921 are first processed by suitable devices to make margin seal 922 and cross seals 923. The sheets are now embossed simultaneously with a grid pattern of troughs or valleys 924. Thus, the rectangular film area 926 in sheet 920 and area 927 in sheet 921 are not embossed. The sheets now form a prefab which may be converted into cushioning by the device of FIG. 31. This inflates the cells and makes long seals 928. Film areas 926 and 927 thus become the upper and lower cell walls. This will be called the "embossed trough construction."

Figure 71:
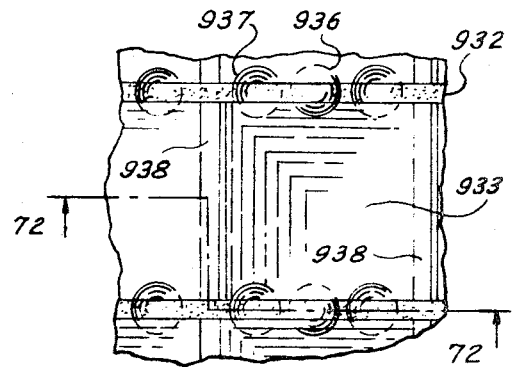
FIG. 71 is a plan of a portion of a prefab showing a cell construction in which the cross sealed areas are embossed with raised areas and depressions.
Figure 68:
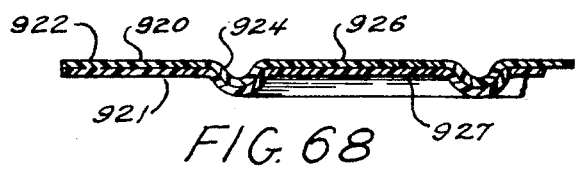
FIG. 68 is an end elevation of FIG. 67.
Figure 69:
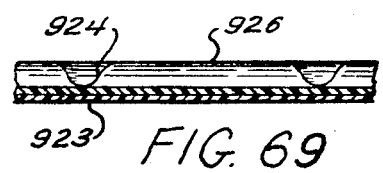
FIG. 69 is a section on the line 69—69 of FIG. 67.
Figure 72:
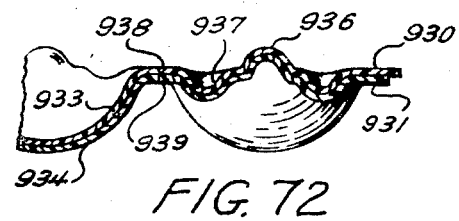
FIG. 72 is a section on the line 72—72 of FIG. 71.
Figure 73:
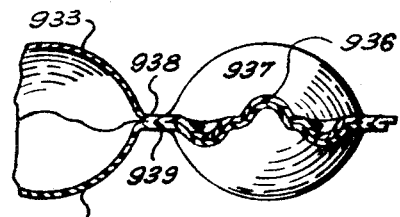
FIG. 73 is an elevation in partial section on the prefab portion shown in FIGS. 71 and 72 after it has been inflated and long sealed.
Figure 70:
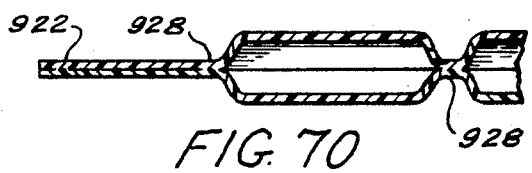
FIG. 70 is a section of a cell resulting from the inflation and long sealing of the prefab, a portion of which is shown in FIGS. 67 and 68.
Figure 74:
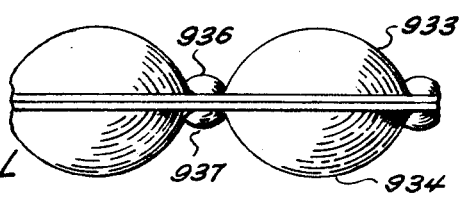
FIG. 74 is a right elevation on FIG. 73.

Another useful cell construction is illustrated in FIGS. 71 and 72 showing the prefab and FIGS 73 and 74 showing a portion of the completed cushioning. Top sheet 930 on bottom sheet 931 are first processed to produce cross seals 932. The sheets then enter an embossing mechanism of a type described before. This forms the cell wall embossments 933 in sheet 930 and 934 in sheet 931. At the same time, the film in and near the cross seals 932 is also embossed with small raised areas 936 and depressions 937, all having the same general shape resembling a small circular mound. The parallel discontinuous strip area 938 in sheet 930 and area 939 in sheet 931 are provided for subsequent long sealing.

In the completed cushioning shown in FIGS. 73 and 74, the effect of the raised areas 936 and depressions 937 is to partially fill the spaces between the cells. This gives a more rigid type of cushioning suitable for many applications.

The cross sealing and long sealing methods described are especially well adapted to the sealing of composite or laminated films. An especially useful composite film, as explained in more detail before, comprises a relatively thick layer of polyethylene and thin layer of vinylidene chloride. The latter will be called by its trade name, "Saran."

A first method of making cushioning from such a composite film is to process two superimposed film sheets so that the polyethylene sides are in contact at the areas to be heat sealed. During heat sealing the heat must pass through the Saran to seal the polyethylene. Saran has a higher melting point than polyethylene so the heat does not alter it and its integrity is maintained.

A second method is to superimpose two sheets so that the Saran sides are in contact. The cross sealing and long sealing equipment described will effectively seal the Saran sides together in spite of the fact that the heat must pass through the polyethylene which has a lower melting point than Saran.

In the above description of the cellular cushioning material of this invention, the cells are described as being filled with a resilient, compressible gas such as air or a compressible solid substance such as a foamed elastomer. It should be noted, however, that incompressible, deformable materials such as solid elastomers or liquids can be used to advantage for some purposes. In this instance, the resiliency of the packaging material will result from the resiliency of the plastic film rather than the materials contained within the cells. Thus, when a pressure force is exerted against one of these cells, the substance within the cell will deform, uniformly distributing pressure against the cell walls and causing the plastic film to yield and absorb various forces.

From the foregoing, it can be understood that this invention provides new cushionings that offer many advantages over other materials now available. The air cell constructions are ideal for disposable cushioning for packing merchandise for shipment and the elastomer-filled constructions are especially well adapted to use in upholstery and furniture. The following is by way of summarizing the principal advantages of the cushioning materials that form the subject matter of this invention.

First, the disposable air cell cushioning offers large savings in shipping costs because of its superior ability to protect articles from dangerous mechanical shock. Excelsior, crumpled or shredded paper and cellulose or cotton pads can all be permanently compressed or may settle and assume a smaller volume. However, each cell in plastic air cell cushioning acts like an air spring. After a cell is compressed, it recovers completely, returning to its original volume in a predictable manner. For these reasons, the predictable and superior performance of one unit thickness of air cell cushioning may make it possible to replace many units thickness of shredded paper or excelsior with an attendant reduction in weight and volume.

Second, the cellular cushioning gives good protection from dust, dirt and fungus growth, and does not provide nesting for vermin.

Third, the cellular cushioning may be heated sealed to itself to form wrappings or bags impervious to moisture, humidity, fumes and corrosive vapors.

Fourth, the cellular cushioning can be made very flexible, allowing it to be easily shaped and fitted into irregularly shaped spaces.

Fifth, the cellular cushioning is clean in appearance and can be colored or transparent, thus providing for an attractive package.

Sixth, the cellular cushioning offers durability in its ability to maintain a tightly packed package over a long period of time.

Seventh, the air pressure established in the cells when the prefab is converted into cushioning may be controlled during the conversion, as explained before, giving either "hard" or "soft" cushioning effect.

Eighth, the cellular cushioning may be made, if desired, from a film of one composition throughout, such as Saran film, thus simplifying the manufacturing process.

Ninth, the fabricating methods enable the cellular cushioning to be made from the thinnest films available. These advantages, coupled with the large potential savings in shipping cost, make plastic film cushioning converted from prefab the logical replacement for older types of materials, especially for the shipment of glass, ceramics, instruments, electronic equipment, and similar products of our electronic and space-age industries.

Tenth, the fabrication method, compared to present methods of making plastic film cushioning, uses one-third less film for the same occupied volume. To illustrate, the only such cushioning now available comprises roughly hemispherical cells embossed in film two mils thick, this film being sealed to an unembossed or "flat" film one mil thick. The present invention makes possible fabrication of completely spherical cells from two films, each 2 mils thick. Thus, twice the cell volume is obtained from one-third more film; or, for the same cell volume, only two-thirds the film weight need be used. Further, the individual cells as formed in the practice of this invention are fully filled with air, still further increasing their efficiency.

With particular regard to prefabs, these can be shipped in a relatively dense, solid roll having perhaps one-twentieth or less of the volume per pound of cushioning with inflated cells. Freight rates vary inversely with density so that the prefabs take advantage of the lowest rates. Taking two cities at random, for example, the freight rate from Reading, Pennsylvania, to Chicago, Illinois, 756 miles, is, for solid rolls, $1.10 per 100 pounds. However, when the material shipped has a density less than 4 pounds per cubic foot, the rate is not only greater, $3.66 per 100 pounds, but a 10,000 pound minimum is charged per car. The average car volume is about 3,200 cubic feet and the inflated cushioning may weigh about 1 pound per cubic foot. Therefore, this would raise the effective rate for shipping inflated cushioning over that of shipping a prefab to $11.40 per 100 pounds or by a factor of about 10. In a similar manner, the costs per pound for handling, warehousing and storing prefab are reduced in a like manner over the costs for inflated cushioning.

Another interesting variation lies in the fact that prefabs made from film tube or with margin seals can be fabricated directly into inflatables of various types with many uses. For example, air mattresses and beach pads can be made by sealing one end of the access channel, such as channel 85 in FIG. 25, and attaching an air valve for inflation by mouth or by air pump. Disposable cushions or pads for tightly packing merchandise may be made from short lengths of prefab by heat sealing one end of the access channel. For example, such a cushion may be placed between one side of a television set and one wall of its shipping carton. The cushion may then be inflated through the other end of the access channel using an air hose. A hand-type impulse sealer may then be used to seal off the cross channels and the air hose removed. In a similar way, cushions may be placed on other sides of the article, tightly packing it in the carton.

The following example is given to show the usefulness and commercial value of air cell cushioning made from prefab.

Assume that a firm regularly ships certain articles by parcel post an average distance of 1,800 miles in the United States and each article is 4 inches × 4 inches × 4 inches and weighs 1 pound. Further assume that excelsior and shredded paper are available 50 miles away and prefab 100 miles away. The following calculations demonstrate the savings that would be made possible through the use of air cell cushioning.

Excelsior and shredded paper are sold in 100 pound bales, a bale of either one having 9.6 cubic feet. In lots of 20 bales or more, the current price per 100 pounds is $4.70 for excelsior and $3.50 for shredded paper, f.o.b. factory. Assume that the lower priced material, shredded paper, is used and that it costs as much to make it as it does to buy it. Then motor freight for 50 miles, full loads, adds an estimated $1.25 per 100 pounds, making the delivered cost $4.75 per 100 pounds or 4.75¢ per pound.

A realistic estimated cost for plastic film prefab made with polyethylene film 1.5 mils thick coated with 0.5 mil thick vinylidene chloride is $1.25 per pound f.o.b. factory. Density is estimated at 60 percent of the solid roll density of 50 pounds per cubic foot or at 30 pounds per cubic foot. Motor freight, 100 miles, full loads, adds an estimated 48¢ per 100 pounds, making the delivered cost $1.73 per pound. Assuming the cost of converting prefab into cushioning at about 25¢ per pound, the total estimated cost of air cell cushioning ready for use is $1.98 per pound.

If the article is packed in shredded paper, a cushioning thickness of about 3.5 inches may be used, calling for a shipping carton 11 inches × 11 inches × 11 inches weighing 1.1 pounds. The shredded paper cushioning fluffed up to about half the bale density of 5 pounds per cubic foot would occupy 0.73 cubic foot and would weigh 3.6 pounds, making the total package weight 5.7 pounds and the shipping weight 6 pounds. However, for the same effectiveness, it is estimated that air cell cushioning 1 inch thick would suffice, calling for a 6 inches × 6 inches × 6 inches carton weighing 0.3 pound. The cushioning, at 1 pound per cubic foot, would weigh about 0.1 pound, making the total package weight 1.4 pounds and the shipping weight 2 pounds. The estimated costs for each package are given below.

Estimated Costs for Shipping a One Pound Article 1,800 Miles by Parcel Post

|  | Shredded Paper | Air Cell Cushioning |
| --- | --- | --- |
| Cushioning | 0.17 | 0.20 |
| Carton | 0.28 | 0.16 |
| Wages at $2/hr. | 0.15 | 0.02 |
| Postage | 1.65 | 0.80 |
|  | $2.25 | $1.18 |

Saving: $1.07 per package

These savings would be even greater for air shipment.

The preferred forms of equipment for making prefabs as described herein make use of operating and design principles that are widely used in the packaging industry. Thus, by utilizing that which is known to the prior art, the equipment may be constructed in a simple and rugged manner with few moving parts, making for ease of repair and low cost operation and maintenance.

So, also, the equipment for converting prefab into cushioning may be simply designed. Note that this equipment is particularly adapted for fast start-up and momentary shut-down, giving it great flexibility. It may be used to make only the amount of cushioning needed at one time, avoiding the need to process, handle and store large quantities at one time. Automatic lengthwise slitting and cutting-to-length devices may be readily added to increase this flexibility.

Due to its simplicity, low cost of construction and small space requirements, the use of a machine by a small plant using a relatively low quantity of cushioning or a number of machines located at different points in larger plants can be justified.

I claim:

1. A method for the manufacture of lightweight, resilient closed-cell cushioning material comprising the sequential steps of:

first fabricating a preform structure by:
continuously feeding two sheets comprised of polymeric materials in superimposed relationship to each other;
forming cross seals by sealing the two sheets together along spaced parallel lines extending substantially across the width of the sheets;
forming a first marginal seal by sealing the two sheets to each other along a line adjacent one end of the cross seals and parallel to and adjacent one side of the sheets;
forming a second marginal seal by sealing the sheets to each other along a line spaced away from the other end of the cross seals and parallel to and adjacent the other side of the sheets;

and second, forming a sealed, inflated cellular structure by:
introducing an inflation device between the second marginal seal and said other end of the cross seals;
introducing gases under pressure by such inflation device into the unsealed spaces between the two sheets;
continuously advancing the sheets with respect to the inflation device in their elongated direction and slitting the second marginal seal; and
forming a plurality of long seals by sealing the sheets together along spaced parallel lines extending lengthwise of the sheets; whereby a plurality of closed cells containing gas under pressure is formed.

2. A method according to claim 1 wherein the first and second marginal seals are formed by initially manufacturing the elongated sheets in the form of a tube.

3. A method according to claim 1 wherein the general shape of each cell is formed prior to inflation by embossing a pattern on the superimposed sheets.

4. A method according to claim 1 including the steps of winding the superimposed sheets onto a roll after the cross seals and first and second marginal seals have been formed and unwinding the sheets from the roll prior to inflation and formation of the plurality of long seals.

5. A method according to claim 3 wherein the pattern is embossed below the heat sealing temperatures of the film.

6. A method according to claim 1 wherein the resiliency of the cellular structure is selectively altered by adjusting the pressure of the gases under pressure.

* * * * *